United States Patent
Nakamura et al.

(10) Patent No.: US 7,409,280 B2
(45) Date of Patent: Aug. 5, 2008

(54) VEHICLE BRAKING CONTROL APPARATUS

(75) Inventors: Hideo Nakamura, Yokohama (JP);
Kazuhiko Tazoe, Fujisawa (JP); Jun Motosugi, Atsugi (JP)

(73) Assignee: Nissan Motor Co., Ltd., Yokohama (JP)

( * ) Notice: Subject to any disclaimer, the term of this patent is extended or adjusted under 35 U.S.C. 154(b) by 213 days.

(21) Appl. No.: 11/025,978

(22) Filed: Jan. 3, 2005

(65) Prior Publication Data

US 2005/0159871 A1    Jul. 21, 2005

(30) Foreign Application Priority Data

Jan. 15, 2004    (JP)    .............. 2004-008243

(51) Int. Cl.
*B60T 13/74* (2006.01)
(52) U.S. Cl. .......................... 701/70; 303/20
(58) Field of Classification Search ............ 701/22, 701/70; 303/20, 152, 112, 155; 180/165, 180/65.1, 65.2, 65.8, 233, 249; 188/181 T, 188/156, 158
See application file for complete search history.

(56) References Cited

U.S. PATENT DOCUMENTS

| | | | |
|---|---|---|---|
| 5,041,978 A * | 8/1991 | Nakayama et al. ............ 701/84 |
| 5,318,355 A | 6/1994 | Asanuma et al. | |
| 5,707,115 A * | 1/1998 | Bodie et al. .................... 303/3 |
| 5,947,221 A * | 9/1999 | Taniguchi et al. ........... 180/197 |
| 6,012,782 A * | 1/2000 | Takahira et al. ............. 303/112 |
| 6,244,674 B1 * | 6/2001 | Kuno et al. .................. 303/152 |
| 6,457,784 B1 * | 10/2002 | Bohm et al. ................ 303/155 |
| 6,719,379 B2 * | 4/2004 | Crombrez .................... 303/152 |
| 6,945,347 B2 * | 9/2005 | Matsuno ...................... 180/242 |

FOREIGN PATENT DOCUMENTS

| | | |
|---|---|---|
| DE | 19639904 A1 | 5/1997 |
| EP | 0906857 A | 4/1999 |
| EP | 1449700 A | 8/2004 |
| JP | 6-153316 A | 5/1994 |
| JP | 11-98609 A | 4/1999 |
| JP | 2004-242460 A | 8/2004 |

* cited by examiner

*Primary Examiner*—Dalena Tran
(74) *Attorney, Agent, or Firm*—Global IP Counselors, LLP

(57) ABSTRACT

A vehicle braking control apparatus is configured to suppress the effect on the vehicle behavior when braking torque is reassigned between the wheels. The distribution of braking torques is reassigned between the front and rear wheels so as to increase the amount of braking carried out by regenerative braking while maintaining a constant total braking torque. When the frictional braking of the one pair of wheels is reassigned to the regenerative braking of the other pair of wheels, the amount reassigned to left and right of the wheels is adjusted in accordance with the steering angle.

25 Claims, 15 Drawing Sheets

VEHICLE BRAKING CONTROL APPARATUS

CROSS-REFERENCE TO RELATED APPLICATIONS

This application claims priority to Japanese Patent Application No. 2004-008243. The entire disclosure of Japanese Patent Application No. 2004-008243 is hereby incorporated herein by reference.

BACKGROUND OF THE INVENTION

1. Field of the Invention

The present invention relates to a vehicle braking control apparatus that can independently brake at least a pair of wheels such that the vehicle braking control apparatus varies (reassigns) the distribution of braking under predetermined conditions between the steering wheels and the other wheels.

2. Background Information

One example of a vehicle braking control apparatus that jointly uses two types of braking devices to perform cooperative braking control is disclosed in Japanese Laid-Open Patent Application No. 11-098609. In this braking control apparatus, a hydraulic-type or other friction-braking device is used in conjunction with a regenerative braking device that uses an electrical load produced by an electric motor/electric generator. The braking control apparatus uses a regenerative cooperative brake control apparatus for controlling braking so that the sum of the frictional braking torque and the regenerative braking torque equals the required total braking torque. Also, the required total braking torque is kept uniform while the braking torque is reassigned between the frictional braking torque and regenerative braking torque under predetermined conditions, and the braking distribution of the front and rear wheels is varied.

In view of the above, it will be apparent to those skilled in the art from this disclosure that there exists a need for an improved vehicle braking control apparatus. This invention addresses this need in the art as well as other needs, which will become apparent to those skilled in the art from this disclosure.

SUMMARY OF THE INVENTION

It has been discovered that when frictional braking torque and regenerative braking torque are reassigned between the front and rear wheels and a simple change occurs in the braking distribution between the front and rear wheels in relation to the ideal front and rear braking torque distribution, then the front and rear distribution is merely disrupted if the vehicle is traveling in a straight line. However, when the vehicle is turning after the front and rear distribution has been disrupted, a new yaw moment is created. In other words, when the vehicle is turning, a new yaw moment not intended by the driver is created due to the braking and steering conditions of the vehicle. When, for example, the steering wheels are the front wheels, a yaw moment is newly created in the understeer direction during a turn when braking torque has simply been reassigned from the rear wheels to the front wheels. Conversely, when the braking torque has been reassigned from the steering front wheels to the rear wheels, a yaw moment is newly created in the oversteer direction. Even if the braking torque distribution of the left and right steering wheels is kept constant while the braking torque is constantly kept to the ideal front and rear braking torque distribution, the yaw moment changes if there is a change in the required total braking torque during a turn.

The present invention was contrived in view of the foregoing situation. One object of the present invention is to provide a vehicle braking control apparatus that can inhibit the effect on vehicle behavior even if braking torque is reassigned between the various wheels.

To solve above-described situation, the present invention provides a vehicle braking control system that comprises a pair of laterally spaced first wheels, a pair of laterally spaced second wheels, an independent braking component, a steering detection component and an excess distribution component. The first wheels are steerable wheels that are configured and arranged to be steered. The second wheels are longitudinally separated from the first wheels in a front to aft vehicle direction. The independent braking component is configured to independently control braking torques applied to the first and second wheels. The steering detection component is configured to detect a steering degree of the first wheels. The excess distribution component is further configured to vary a front and rear braking torque distribution between the first and second wheels while keeping a total required braking torque imparted to all of the wheels substantially constant. The excess distribution component includes a left and right wheel distribution adjusting component configured to adjust a left and right braking torque distribution of at least one of the pairs of the first and second wheels so that a left and right braking torque difference is applied to suppress a vehicle behavior that accompanies varying of the front and rear braking torque distribution between the first and second wheels based on the steering degree in the first wheels upon determining that steering in the first wheels is present.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Figure 1:
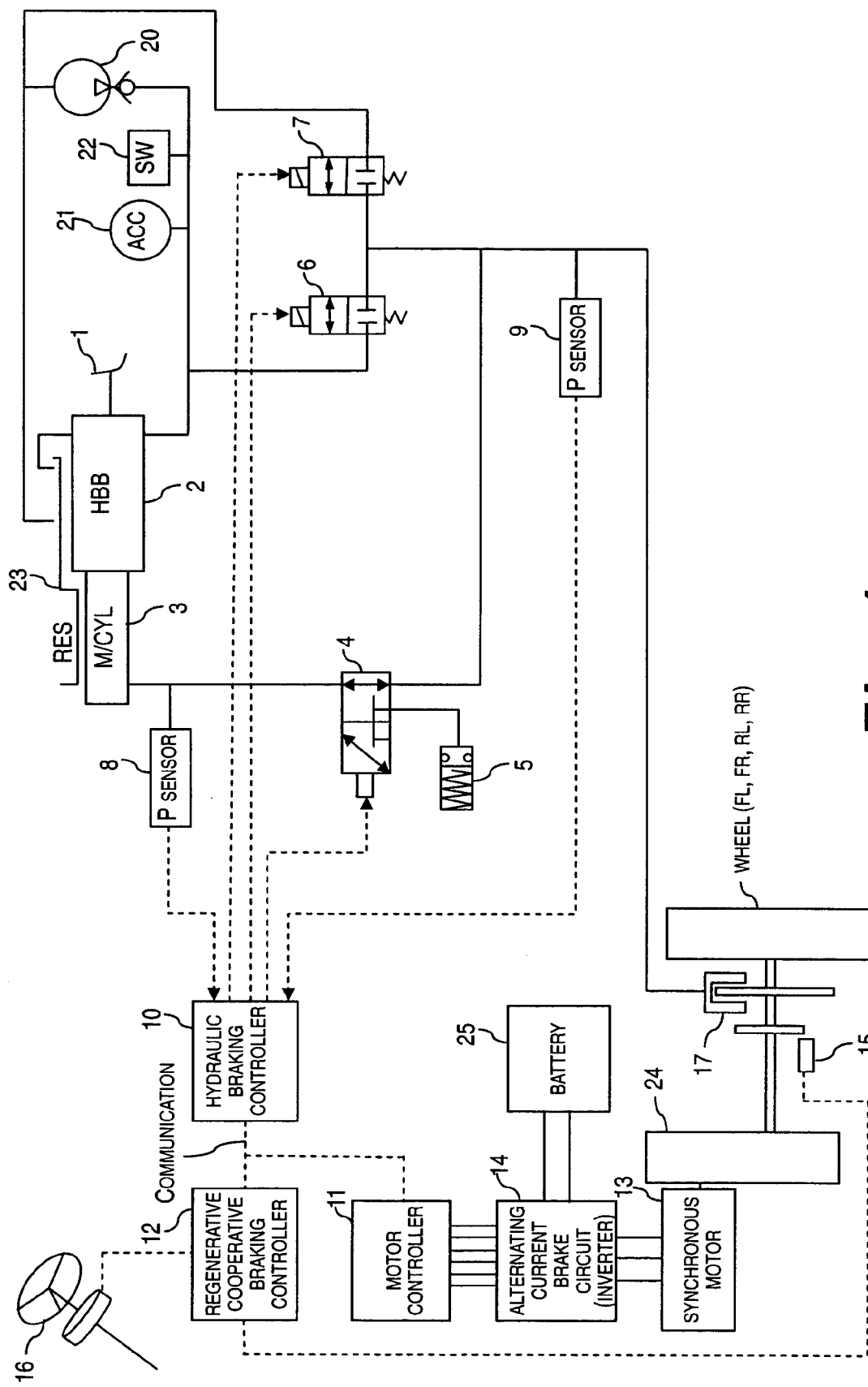
FIG. 1 is a simplified schematic block diagram of a vehicle equipped with a vehicle braking control apparatus in accordance with a preferred embodiment of the present invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

In the subsequent detailed descriptions of the present invention, the parts of the various embodiments that are identical will be given the same reference numerals for the sake of simplify. Moreover, the descriptions of the component parts of the second embodiment and other embodiments, that are the same or have similar functions as corresponding component parts of the first embodiment may be simplified or omitted. Thus, unless otherwise specified, the rest of the configuration of the vehicle and the processing in the subsequent embodiment are the same as the configuration of the first embodiment.

Referring initially to FIG. 1, a simplified schematic block diagram of a vehicle is illustrated to explain preferred embodiments of the present invention. In particular, in FIG. 1, the vehicle is equipped with a vehicle braking control apparatus that is provided with a "regenerative cooperative braking control system" in accordance with the preferred embodiments of the present invention. The vehicle of FIG. 1 is equipped with four wheels (i.e., a front left wheel FL, a front right wheel FR, a rear left wheel RL and a rear right wheel RR) that includes a drive train (not shown in FIG. 1) to provided a driving force to one or more of the wheels FL, FR, RL and RR. Thus, the vehicle of FIG. 1 that is equipped with the vehicle braking control apparatus includes either a front wheel drive train, or a rear wheel drive train or an all-wheel drive train.

As explained in greater detail below, the vehicle braking control apparatus is configured and arranged to detect a steering degree of a pair of laterally spaced first wheels (e.g., the front wheels FL and FR) that are configured and arranged to be steered, and detect a total braking command value to be applied to the first steering wheels and a pair of laterally spaced second wheels (e.g., the rear wheels RL and RR) that are longitudinally separated from the first steering wheels in a front to aft vehicle direction. The vehicle braking control apparatus is configured and arranged to vary a front and rear braking torque distribution between the first and second wheels while keeping a total required braking torque imparted to all of the wheels substantially constant, and adjust a left and right braking torque distribution of at least one of the pairs of the first and second wheels so that a left and right braking torque difference is applied to suppress a vehicle behavior that accompanies varying of the front and rear braking torque distribution based on the steering degree in the first wheels upon determining that steering in the first wheels is present.

The distribution of braking torque to the left and right steering wheels produced by the steering is adjusted by creating a difference between the left and right braking torques, so that the difference between the left and right braking torques is increased in the direction in which vehicle behavior that accompanies the variation in distribution is suppressed as the steering amount increases. Alternatively, the adjustment can be carried out so that a difference is created between the left and right braking torques in the direction of suppressing vehicle behavior that accompanies the variation in distribution on the basis of the steering direction.

In accordance with one embodiment of the present invention, adjustments are made to the braking torque distribution between the left and right steering wheels in accordance with the steering angle and other steering information when the braking torque distribution to the non-steering wheels is varied according to the relationship with other wheels. As a result, the occurrence of vehicle behavior that accompanies a variation in distribution and is not intended by the driver can be suppressed or reduced.

In the preferred embodiments, the vehicle braking control apparatus of the present invention basically includes a frictional braking system configured and arranged to impart independent frictional braking on each wheel of the wheels FL, FR, RL and RR, and a regenerative braking system configured and arranged to impart a regenerative braking torque on one or more of the wheels FL, FR, RL and RR. As will be explained in further detail below, the vehicle of FIG. 1 is equipped with either independent regenerative braking or non-independent regenerative braking that is applied to either the front wheels FL and FR or rear wheels RL and RR. In any case, the regenerative braking system is configured and arranged to effectively recover regenerative energy by controllably reducing the use of the frictional braking system and imparting a regenerative braking torque on one or more of the wheels FL, FR, RL and RR.

A single wheel alone is depicted in FIG. 1, but the frictional (hydraulic) braking system is also configured in the same manner with three other wheels, and braking to each wheel can be independently controlled. Also in some embodiments, the braking devices of the front wheels FL and FR are solely frictional braking devices, while the braking devices of the rear wheels RL and RR include both frictional braking devices and regenerative braking devices. However, it should be noted that in some embodiments, the braking devices of the rear wheels RL and RR are solely frictional braking devices, while the braking devices of the front wheels FL and FR include both frictional braking devices and regenerative braking devices.

In the illustrated embodiment, the left and right front wheels FL and FR are steering wheels, and the left and right rear wheels RL and RR are non-steering wheels. However, it should be noted that the non-steering rear wheels are the other wheels, but the other wheels are not necessarily non-steering wheels.

As seen in FIG. 1, the frictional braking system is a relatively conventional frictional braking system that includes a brake pedal 1, a hydraulic booster 2, a master cylinder 3, a magnetic valve 4, a stroke simulator 5, a proportional pressurizing magnetic valve 6, a proportional depressurizing magnetic valve 7, an output sensor 8, an output sensor 9 and a hydraulic braking controller 10. The hydraulic braking controller 10 independently controls the hydraulic pressure in a conventional manner for imparting braking through frictional braking torque on the basis of hydraulic pressure on each of the wheels FL, FR, RL and RR.

Basically, the regenerative braking system includes a motor controller 11, a regenerative cooperative braking controller 12, one or more alternating synchronous electric motors 13 and an electric current control circuit 14 (inverter) for AC/DC conversion. The one or more electric motors 13 are operatively coupled to one or more of wheels FL, FR, RL and RR so that either a pair of front wheels or a pair of rear wheels are driven/braked by the one or more electric motors 13. In other words, in the present embodiment, the regenerative braking system based on the electric motor(s) 13 is either independently or non-independently provided to a pair of left and right wheels. The motor controller 11 controls regenerative braking torque on the basis of the regenerative braking torque command value from the regenerative cooperative braking controller 12. Thus, the regenerative braking system is configured and arranged such that a regenerative braking torque is applied on one or more of the wheels FL, FR, RL and RR. The regenerative braking torque is in the form of an electrical load that is produced by the alternating synchronous electric motor 13, as shown in FIG. 1.

The operation of the frictional braking system will be explained with reference to FIG. 1. The brake pedal 1 is operated to create the braking torque stipulated by the driver, and the brake pedal 1 is linked to the master cylinder 3 by way of the hydraulic booster 2. The hydraulic booster 2 boosts and feeds braking pressure (downward force of the pedal) to the master cylinder 3 in accordance with the amount of downward force applied to the brake pedal 1, using high braking hydraulic pressure created by a pump 20 and stored in an accumulator 21. The high braking hydraulic pressure is also used as the base pressure for hydraulic pressure feedback control. The pump 20 is sequentially controlled by a pressure switch 22. Also, a hydraulic fluid reservoir 23 is provided for supplying hydraulic fluid to the hydraulic braking devices.

The master cylinder 3 is connected to the wheel cylinder 17 of each wheel by way of the magnetic valve 4 for switching fluid channels. FIG. 1 shows a state in which the magnetic valve 4 for switching fluid channels is not energized, and illustrates a state in which the fluid of the master cylinder 3 is fed directly to the wheel cylinder 17.

When the magnetic valve 4 for switching fluid channels is energized, the master cylinder 3 becomes connected to the stroke simulator 5 (the same hydraulic load as the wheel cylinder 17) and is disconnected from the wheel cylinders 17. In this condition, when the proportional pressurizing magnetic valve 6 for controlling the hydraulic pressure is energized, the output pressure of the pump 20 or the stored pressure in the accumulator 21 is fed to each wheel cylinder 17 to increase the pressure. Conversely, when the proportional depressurizing magnetic valve 7 for controlling the hydraulic pressure is energized, the braking hydraulic pressure of each wheel cylinder 17 is restored to that of the reservoir 23 to reduce the pressure. The braking hydraulic pressure of the wheel cylinders 17 can thereby be individually controlled.

The output pressure of the master cylinder 3 (required amount of braking by the driver) is detected by the output sensor 8, and the detection signal is fed to the hydraulic braking controller 10. The braking hydraulic pressure of each wheel cylinder 17 in a state disconnected from the master cylinder 3 is detected by the output sensor 9, and this detection signal is also fed to the hydraulic pressure braking controller 10.

In a state in which the master cylinder 3 and each wheel cylinder 17 are disconnected by the magnetic valve 4 for switching fluid channels, the hydraulic pressure braking controller 10 controls the pressurizing magnetic valve 6 and the depressurizing magnetic valve 7 on the basis of the detection signals from the output sensors 8 and 9. The braking hydraulic pressure is individually controlled for each wheel cylinder 17. The braking torque produced is thereby imparted to the wheels by a frictional load with the desired magnitude.

The operation of the regenerative braking system will now be explained in more detail with reference to FIG. 1. In addition to the engine (not shown), the alternating synchronous motor(s) 13 is linked to one or both of the drive wheels by way of a deceleration mechanism 24. The electric motor 13 operates as a drive motor for transmitting drive torque to the drive wheels. The electric motor 13 also operates as an electric generator by the road surface drive torque from the drive wheels, and store vehicle kinetic energy produced by regenerative braking control as electricity in a battery 25 by way of the electric current control circuit 14 (inverter) for AC/DC conversion. In other words, when electric power is recovered to the battery 25, the road surface drive torque is consumed in order to rotate the electric motor 13, and braking torque is imparted to the drive wheels as a result. The inverter 14 converts the electric current between alternating current and direct current on the basis of a three-phase PWM signal from the motor controller 11. In other words, the electric motor 13 is controlled based on commands from the motor controller 11.

The motor controller 11 controls regenerative braking torque on the basis of the regenerative braking torque command value from the regenerative cooperative braking controller 12. Also, the drive torque produced by the electric motor 13 is controlled during driving. The motor controller 11 calculates the maximum allowable regenerative torque value that is determined based on the charged state of the battery 25, the temperature, and other factors, and the calculation result is fed to the regenerative cooperative braking controller 12. A wheel velocity sensor 15 is provided for measuring the wheel velocity. Magnetic pickup or another method may be used, for example. The steering angle sensor 16 is provided in which an encoder or the like is used.

The hydraulic braking controller 10, the motor controller 11, and the regenerative cooperative braking controller 12 constitute an excess distribution component that is configured and arranged to reassign regenerative braking torque command values and hydraulic pressure braking torque command values to the appropriate wheel. Here, the hydraulic braking controller 10, the motor controller 11, and the regenerative cooperative braking controller 12 are composed of, for example, one-chip microcomputer (or a plurality of chips that realize the same functions) having various timer functions, a CPU, ROM, RAM, digital ports, and A/D ports, as well as a high-speed communication circuit and other components. It will be apparent to those skilled in the art from this disclosure that the precise structure and algorithms for the hydraulic braking controller 10, the motor controller 11 and the regenerative cooperative braking controller 12 can be any combination of hardware and software that will carry out the functions of the present invention. In other words, "means plus function" clauses as utilized in the specification and claims should include any structure or hardware and/or algorithm or software that can be utilized to carry out the function of the "means plus function" clause.

Figure 2:
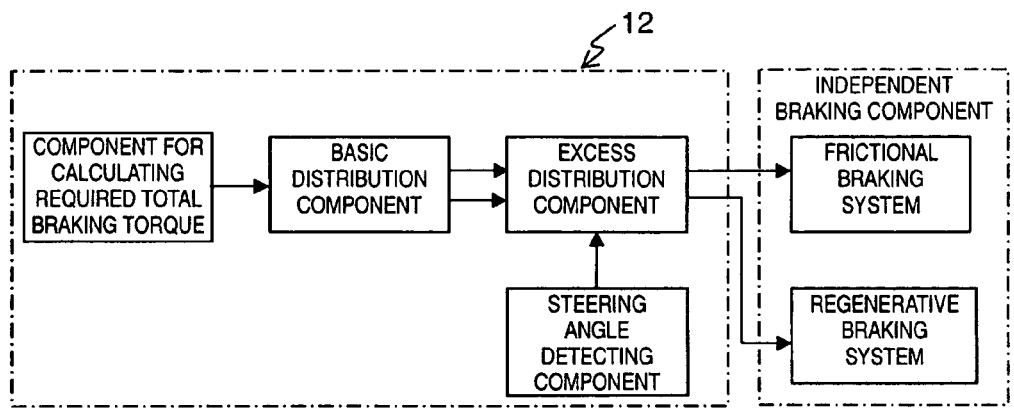
FIG. 2 is a functional block diagram of the regenerative cooperative braking controller and the braking systems in accordance with the preferred embodiment of the present invention.

Here, FIG. 2 shows a functional block diagram related to the present invention. In this functional block diagram, the independent braking device is configured with the hydraulic braking controller 10 and the motor controller 11, and the other functions are implemented with a regenerative cooperative braking controller 12.

Next, the routine carried out by the regenerative cooperative braking controller 12 is described with reference to FIG. 3. In the present embodiment, acceleration and torque are such that deceleration and torque in the braking direction are defined as negative values. The routine for the regenerative cooperative braking controller 12 is carried out at a predetermined sampling cycle (10 msec, for example).

First, in step S10, the output pressure $P_{mc}$ of the master cylinder 3 (total required braking amount requested by the driver) and the braking hydraulic pressure $P_{WC}$ of each wheel cylinder 17 are computed based on the detection signals from the output sensors 8 and 9, and the system then advances to step S20.

In step S20, the velocity of each wheel is measured based on signals from the wheel velocity sensors by using a timer with an input capture function in the microcomputer, and the term $V_w$ is taken to be the maximum value thereof. Bandpass filtering indicated by the transmission variable Fbpf(s) in the Equation (1) below is furthermore carried out, the estimated value $\alpha_v$ of deceleration of the drive wheels is calculated, and the system advances to step S30.

$$Fbpf(s) = \frac{s}{\left(\frac{s^2}{\omega^2}\right) + \left(\frac{2\zeta s}{\omega}\right) + 1} \quad (1)$$

In actual practice, the calculation is performed using a recurrence Equation obtained through digitization with the Tustin approximation or another approximation. In the Equation (1), the term "s" is a Laplace operator, the term ω is the intrinsic angle frequency, and the term ζ is an attenuation coefficient.

In step S30, the maximum allowable regenerative torque $T_{mmax}$ that can be currently used is read from the high-speed communication receiving buffer connected to the motor controller 11, and the system advances to step S40. The motor controller 11 determines the maximum allowable regenerative torque $T_{mmax}$ in accordance with the charge ratio of the battery, and other factors.

In step S40, the target deceleration $\alpha_{dem}$ is calculated using the master cylinder pressure $P_{mc}$ and a vehicle specification constant K1 stored in the ROM in advance, and the system advances to step S50.

$$\alpha_{dem} = -(P_{mc} \cdot \text{constant } K1) \quad (2)$$

Here, not only is the target deceleration $\alpha_{dem}$ determined by the physical amount instructed by the driver via the master cylinder hydraulic pressure $P_{mc}$, but the settings are also varied in accordance with physical amounts based on the automatic braking of inter-vehicle distance control, velocity control, and other types of control in a vehicle with these types of control.

In step S50, the braking torque command value $T_{d\_FF}$ (feed forward term) required to realize the target deceleration $\alpha_{dem}$ is calculated, and the system advances to step S60. More specifically, the target deceleration $\alpha_{dem}$ is first transformed into braking torque by using a vehicle specification constant K2. Furthermore, the braking torque command value $T_{d\_FF}$ (feed forward term) is calculated by performing the $C_{FF}(s)$ expressed below by Equation (3) for a feed forward compensator (phase compensator) in order to cause the response characteristics $P_m(s)$ of the controlled vehicle to match the reference model characteristics $F_{ref}(s)$. In actual practice, digitization and calculation are performed in the same manner as described above.

$$C_{FF}(s) = \frac{F_{ref}(s)}{P_m(s)} = \frac{(Tp \cdot s + 1)}{(Tr \cdot s + 1)} \quad (3)$$

In step S60, the master cylinder pressure $P_{mc}$ and a predetermined value (value approximate to zero) are compared. If the master cylinder pressure $P_{mc}$ is greater (brake operation by the driver), the system advances to step S70, and if smaller (no brake operation), the system advances to step S90.

Figure 4:
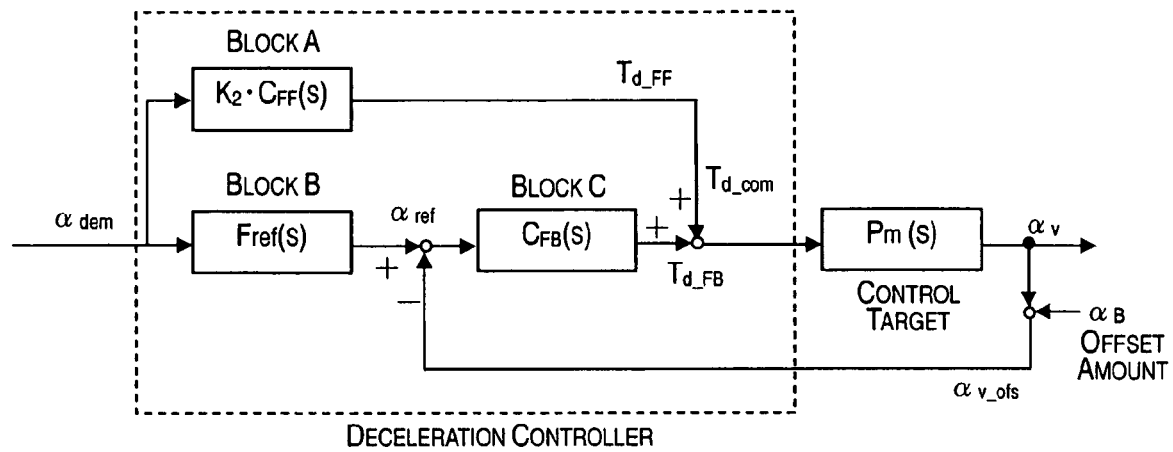
FIG. 4 is a simplified schematic block diagram showing an example of a configuration of the deceleration controller in accordance with the preferred embodiment of the present invention.

In step S70, a braking torque command value $T_{d\_FB}$ (feedback term) required to realize the target deceleration $\alpha_{dem}$ is calculated in the subsequently described routine, and the system advances to step S80. Here, the deceleration controller of the present embodiment is configured with "two degrees of freedom," as shown in FIG. 4. The deceleration controller is composed of a feed forward compensator (block A), a reference model (block B), and a feedback compensator (block C). The stability, resistance to external disturbance, and other closed loop capabilities are adjusted with the feedback compensator, and responsiveness to the target acceleration is adjusted in principle (when there is no modeling error) with the feed forward compensator.

First, the target deceleration $\alpha_{dem}$ is modeled with the reference model $F_{ref}(s)$ expressed by the Equation below to calculate the reference deceleration $\alpha_{ref}$.

$$F_{ref}(s) = \frac{1}{(Tr \cdot s + 1)} \quad (4)$$

The estimated deceleration value $\alpha_v$ described above is subtracted from the reference deceleration $\alpha_{def}$ calculated in this manner, and the feedback bias $\Delta\alpha$ is computed.

$$\Delta\alpha = \alpha_{ref} - \alpha_v \quad (5)$$

The feedback bias $\Delta\alpha$ is processed by the feedback compensator $C_{FB}(s)$ to calculate the braking command value $T_{d\_FB}$ (feedback term). In the present embodiment, the feedback compensator $C_{FB}(s)$ performs this operation with a basic PI controller, as demonstrated by Equation (6) below. The control constants Kp and Ki in the following Equation are set with consideration given to the gain margins or phase margins.

$$C_{FB}(s) = \frac{(Kp \cdot s + Ki)}{s} \quad (6)$$

In step S80, the braking command value $T_{d\_com}$ is calculated by using an adder to add the F/F and F/B terms of the calculated braking torque command values, and the system advances to step S100. Equations (4) and (6) carry out calculations with the recurrence Equation obtained through digitizing in the same manner as described above.

In step S90, the braking torque command value $T_{d\_FB}$ (feedback term) and the internal variables used in the computation of the feedback compensator (digital filter) are initialized (the integral term of the PI compensator is initialized).

Figure 5:
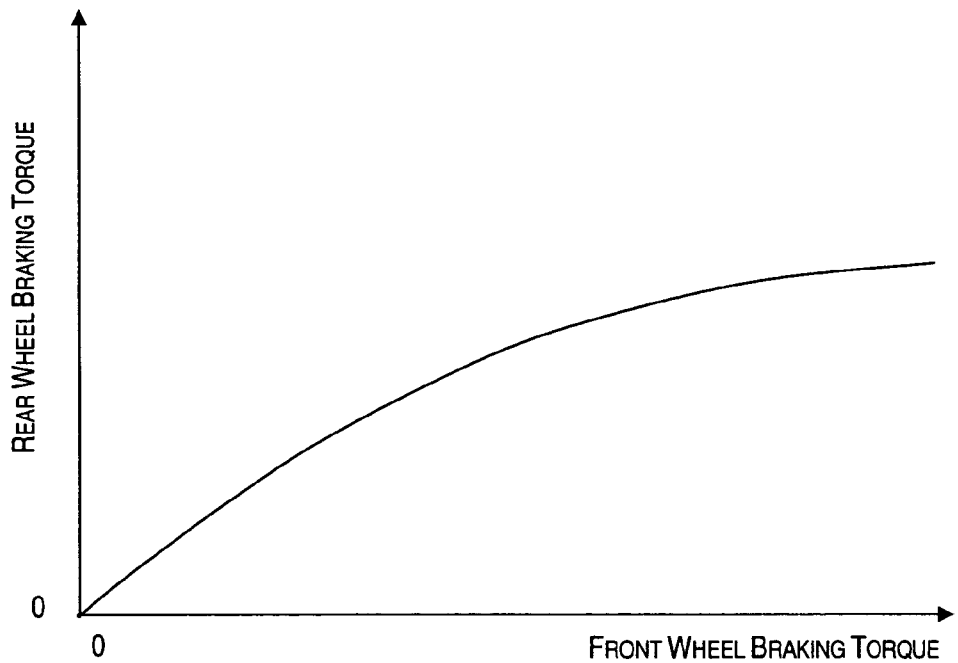
FIG. 5 is a graph showing an example of the front and rear distribution in accordance with the preferred embodiment of the present invention.

In step S100, the braking torque command value $T_{d\_com}$ is distributed in an ideal fashion to the front and rear wheels, and the system advances to step S110. In other words, an ideal distribution line such as one in which the front and rear wheels are simultaneously locked, a distribution line in which the front wheels are slightly biased to avoid locking the rear wheels first, or other basic front and rear distribution characteristics such as those shown in FIG. 5 are stored in a table in advance with consideration for the movement of the front and rear load during deceleration, and the braking torque command value $T_{d\_com}$ is distributed to the front wheel braking torque command values $T_{d\_FR}$ and $T_{d\_FL}$, and to the rear wheel braking torque command values $T_{d\_RR}$ and $T_{d\_RL}$ by looking up these values in the table. That is to say, the basic distribution amount for each of the four wheels is determined.

$$T_{d\_FR} = 0.5 \times \text{table lookup for front wheels (input:} T_{d\_com}) \quad (7.1)$$

$$T_{d\_FL} = 0.5 \times \text{table lookup for front wheels (input:} T_{d\_com}) \quad (7.2)$$

$$T_{d\_RR} = 0.5 \times \text{table lookup for rear wheels (input:} T_{d\_com}) \quad (7.3)$$

$$T_{d\_RL} = 0.5 \times \text{table lookup for rear wheels (input:} T_{d\_com}) \quad (7.4)$$

In step S110, the results are assigned as much as possible to the regenerative braking torque command value of the rear wheels, and the remainder is assigned to the hydraulic pressure braking torque command value with the aim of improving fuel economy within the range of braking torque command values for each wheel in accordance with the ideal front and rear braking torque distribution calculated in step S100, and the system advances to step S120. The basic distribution to the four wheels remains unchanged. It should be noted that the present embodiment is an example of a regenerative braking device that is applied solely to the rear wheels, and the braking torques are all negative values.

In other words, in step S110, the braking torque command values for the left and right rear wheels that have been set in step S100 are assigned to the regenerative braking torque command value and the hydraulic pressure torque command value, respectively, and the system advances to step S120. When the assignment is made, the routine is carried out so as to assign as much of the command value as possible to the regenerative braking torque command value.

In other words, the amount assigned to the regenerative braking torque command value is calculated first on the basis of the Equations below. If the braking torque command value is absolutely greater than the maximum allowable regenerative torque that can be used by assignment on the basis the Equations below, the regenerative braking torque command value is assigned to a command value equivalent to the maximum allowable regenerative torque. Were this not the case, the regenerative braking torque command value would be the same value as the braking torque command value, and the hydraulic pressure braking torque command value would be zero.

$$T_{m0\_RR} = \max(T_{d\_RR}, T_{mmax\_RR}) \quad (8.1)$$

$$T_{m0\_RL} = \max(T_{d\_RL}, T_{mmax\_RL}) \quad (8.2)$$

In the Equations, the terms $T_{mmax\_RL}$ and $T_{mmax\_RR}$ are the maximum allowable regenerative torques in the left and right rear wheels, respectively.

Next, the hydraulic pressure braking torque command value assigned to each wheel is calculated based on the Equations below. On the front wheel side, the braking torque command value is taken to be the hydraulic braking torque command value in unaltered form, but on the back wheel side, only an amount equivalent to the portion not assigned to the regenerative braking torque command value taken to be the hydraulic pressure braking torque command value.

$$T_{b0\_FR} = T_{d\_FR} \quad (9.1)$$

$$T_{b0\_FL} = T_{d\_FL} \quad (9.2)$$

$$T_{b0\_RR} = T_{d\_RR} - T_{m0\_RR} \quad (9.3)$$

$$T_{b0\_RL} = T_{d\_RL} - T_{m0\_RL} \quad (9.4)$$

In step S120, an excess distribution computation unit that constitutes an excess distribution computation device is started, correction based on the steering angle information is carried out, and the system then advances to step S130.

In step S130 the hydraulic pressure command value of the each of the front and rear wheels is calculated as shown by the following Equations by using a vehicle specification constant K3 stored in ROM in advance on the basis of the hydraulic pressure braking torque command for each wheel, and the system advances to step S140.

$$P_{b\_FR} = -(T_{b\_FR} \cdot \text{constant } K3) \quad (10.1)$$

$$P_{b\_FL} = -(T_{b\_FL} \cdot \text{constant } K3) \quad (10.2)$$

$$P_{b\_RR} = -(T_{b\_RR} \cdot \text{constant } K3) \quad (10.3)$$

$$P_{b\_RL} = -(T_{b\_RL} \cdot \text{constant } K3) \quad (10.4)$$

In step S140, the hydraulic pressure command value and the regenerative braking torque command value for each wheel are fed to the hydraulic pressure braking controller 10 and the motor controller 11, respectively, and the routine is completed.

Next, the processing carried out by the excess distribution computation unit is described with reference to FIG. 6.

The recoverable surplus amount of the regenerative braking torque in the rear wheels is first calculated in step S300 on the basis of the Equations shown below, and the system advances to step S310.

$$T_{mmargin\_RR} = T_{mmax\_RR} - T_{m0\_RR} \quad (11.1)$$

$$T_{mmargin\_RL} = T_{mmax\_RL} - T_{m0\_RL} \quad (11.2)$$

In step S310, the braking torque $\Delta T$ that can be reassigned between the front and rear wheels is calculated based on the following Equation, and the system advances to step S320. All the braking torques are negative values.

$$\Delta T = \max\{(T_{mmargin\_RR} + T_{mmargin\_RL}), (T_{b0\_FR} + T_{b0\_FL})\} \quad (12)$$

In other words, the lesser of the two values selected from the absolute value of the excess amount of the total regenerative braking torque and the absolute value of the total braking torque command value on the front wheel side is taken to be the re-assignable braking torque $\Delta T$ between the front and rear wheels. If the absolute value of the total braking torque command value is less on the front wheel side, as described below, the total braking torque command value portion on the front wheel side will thereby be reassigned to the regenerative braking of the rear wheel side. Conversely, if the absolute value of total braking torque command value on the front wheel side is greater, an amount equal to the surplus amount of total regenerative braking torque will be reassigned to regenerative braking.

In step S320, the steering angle $\delta$ which constitutes steering information, is calculated from a detection value obtained by measuring the rotation angle and direction on the basis of the edge or level of the output pulse of the encoder or another steering angle sensor in another routine with a shorter computational cycle, and the system advances to step S330.

Figure 7:
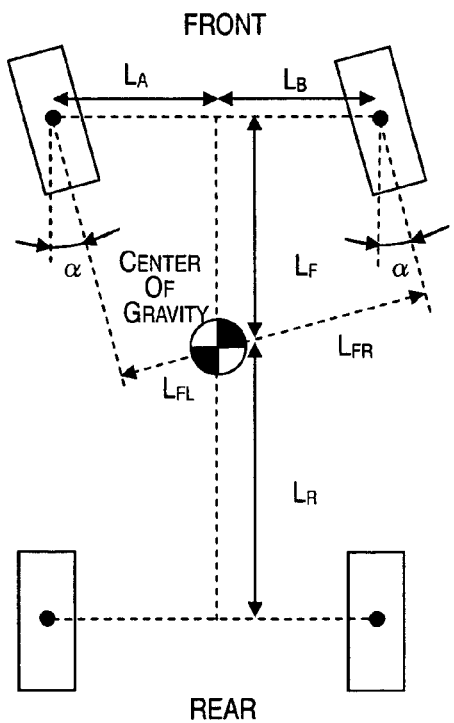
FIG. 7 is a simplified schematic diagram of the vehicle showing the moment arm lengths in accordance with the preferred embodiment of the present invention.

In step S330, the actual steering angle $\alpha$ of the front wheels is calculated from the steering angle $\delta$ by using the gear ratio of the steering mechanism. Furthermore, in step S340, the direct distances $L_{FL}$, $L_{FR}$, $L_{RL}$, $L_{RR}$ (moment arm lengths) from the center of gravity of the vehicle to the vectors in the direction of rotation of each wheel are calculated based on the Equations below, and the system advances to step S350. The distances $L_A$, $L_B$, $L_F$, and $L_R$ used in the following Equations are defined as shown in FIG. 7.

$$L_{FL} = (L_F^2 + L_A^2)^{1/2} \cdot \sin(\phi - \alpha), \text{ where } L_A/L_F = \tan \phi \quad (13.1)$$

$$L_{FR} = (L_A + L_B) \cos \alpha - L_{FL} \quad (13.2)$$

$$L_{RL} = L_A \quad (13.3)$$

$$L_{RR} = L_B \quad (13.4)$$

In step S350, the reassigned braking torque amounts $F_{FR}$, $F_{FL}$, $F_{RR}$, and $F_{RL}$ for each wheel that satisfy Equations (14) and (15) below are calculated (A) Condition in which the total braking torque is constant $$F_{FR} + F_{FL} = F_{RR} + F_{RL} \quad (14)$$

(B) Condition in which there is no new yaw moment generated $$F_{FL} \cdot L_{FL} - F_{FR} \cdot L_{FR} - F_{RL} \cdot L_{RL} + F_{RR} \cdot L_{RR} = 0 \quad (15)$$

In this embodiment, the Equation (14) can be expressed in terms of the effective tire radius R, i.e., $F_{FR} + F_{FL} = F_{RR} + F_{RL} = \Delta T/R$. Assuming $F_{RL} = F_{RR}$, for example, the Equations can easily be solved because they are simultaneous linear Equation for $F_{FR}$ and $F_{FL}$. Also, the regenerative braking devices of the rear wheels RL and RR are not necessarily left and right independent. After calculating the reassigned braking torque amounts $F_{FR}$, $F_{FL}$, $F_{RR}$, and $F_{RL}$, the system then advances to step S360.

In step S360, the final regenerative braking torque command value and hydraulic braking torque command value for each wheel are calculated based on the Equations below, and the system then returns to the beginning.

Regenerative braking torque command values:

$$T_{m\_RR} = T_{m0\_RR} + F_{RR} \cdot R \quad (16.1)$$

$$T_{m\_RL} = T_{m0\_RL} + F_{RL} \cdot R \quad (16.2)$$

Hydraulic pressure braking torque command values:

$$T_{b\_FR} = T_{b0\_FR} - F_{FR} \cdot R \quad (17.1)$$

$$T_{b\_FL} = T_{b0\_FL} - F_{FL} \cdot R \quad (17.2)$$

The hydraulic pressure braking torque command values for the rear wheels remains unchanged as indicated in the above Equations (9.3) and (9.4).

Here, the above-described step S320 constitutes a steering detection component or device, and steps S330 to S360 constitute left and right distribution adjustment component or device.

The operation, action, effect, and other attributes of the control procedure are described next. With the present braking control apparatus, pressing the brake pedal 1 downward causes the total braking torque command value $T_{d\_com}$ that corresponds to this requirement to be calculated, and the total braking torque command value to be distributed to the front and rear wheels on the basis of a predetermined ideal distribution. At this point, with rear wheels in which braking is carried out with frictional braking and regenerative braking, the braking torque command values distributed to the left and right rear wheels are distributed separately for the frictional braking and regenerative braking, but an improvement in fuel economy can be ensured at this time by distributing the command values to regenerative braking to the extent possible.

Furthermore, when surplus regenerative braking torque is available, priority can be placed on fuel economy, and all or part of the braking torque command value on the front wheel side can be assigned to regenerative braking on the rear wheel side. In a state in which surplus regenerative braking torque is available, braking on the rear wheel side is carried out solely with regenerative braking, and the hydraulic braking torque command value on the rear wheel side is zero.

Assuming, for example, that the maximum regenerative braking torque is constant, carrying out such control will cause regenerative braking torque to initially be generated in the rear wheels when the brake pedal 1 is gradually pressed downward and the required total braking torque is gradually increased. When the required total braking torque furthermore exceeds the maximum regenerative braking torque, the frictional braking torque is also added to the front wheel side, and when the balance of the front and rear braking torque reaches an ideal state, the frictional braking torque of the front and rear wheels is increased in accordance with the required total braking torque while the ideal distribution is maintained.

When the maximum regenerative braking torque gradually increases while the required total braking torque remains constant, the ideal distribution to the front and rear wheels is preserved until the frictional braking torque of the rear wheels is entirely replaced with regenerative braking torque. When the maximum regenerative braking torque increases further, the frictional braking torque on the front wheel side replaces the regenerative braking torque of the rear wheels, and the system changes to a state in which the ideal distribution to the front and rear wheels becomes unbalanced. The maximum regenerative braking torque varies depending on the charge ratio of the battery 25 that takes in regenerative electric power, the rotational speed of the electric motor 13 (proportional to the vehicle velocity), and other factors.

If it is assumed herein that braking power is simply reassigned between the front and rear wheels without regard to whether the total braking torque has an ideal front and rear braking torque distribution. In other words, the frictional braking torque of the front wheels is reassigned to the regenerative braking torque of the rear wheels, and the amount reassigned to the left and right wheels of the front and the rear wheels is simply set to the same amount, then the front and rear distribution will merely be unbalanced if the vehicle is traveling in a straight line, but a new yaw moment not intended by the driver will be created as a result of placing priority on improving the fuel economy when the vehicle is turning.

In contrast, optimizing the reassigned distributed amount in the front left and right wheels so as to satisfy the Equations (14) and (15) on the basis of steering information allows the braking control apparatus of the present embodiment to reduce the occurrence of the new reassignment-induced yaw moment while delivering the required total braking torque. As a result, deterioration of steering stability can be prevented while maximum regenerative braking is delivered even during turning.

ALTERNATE PROCESSING

Figure 8:
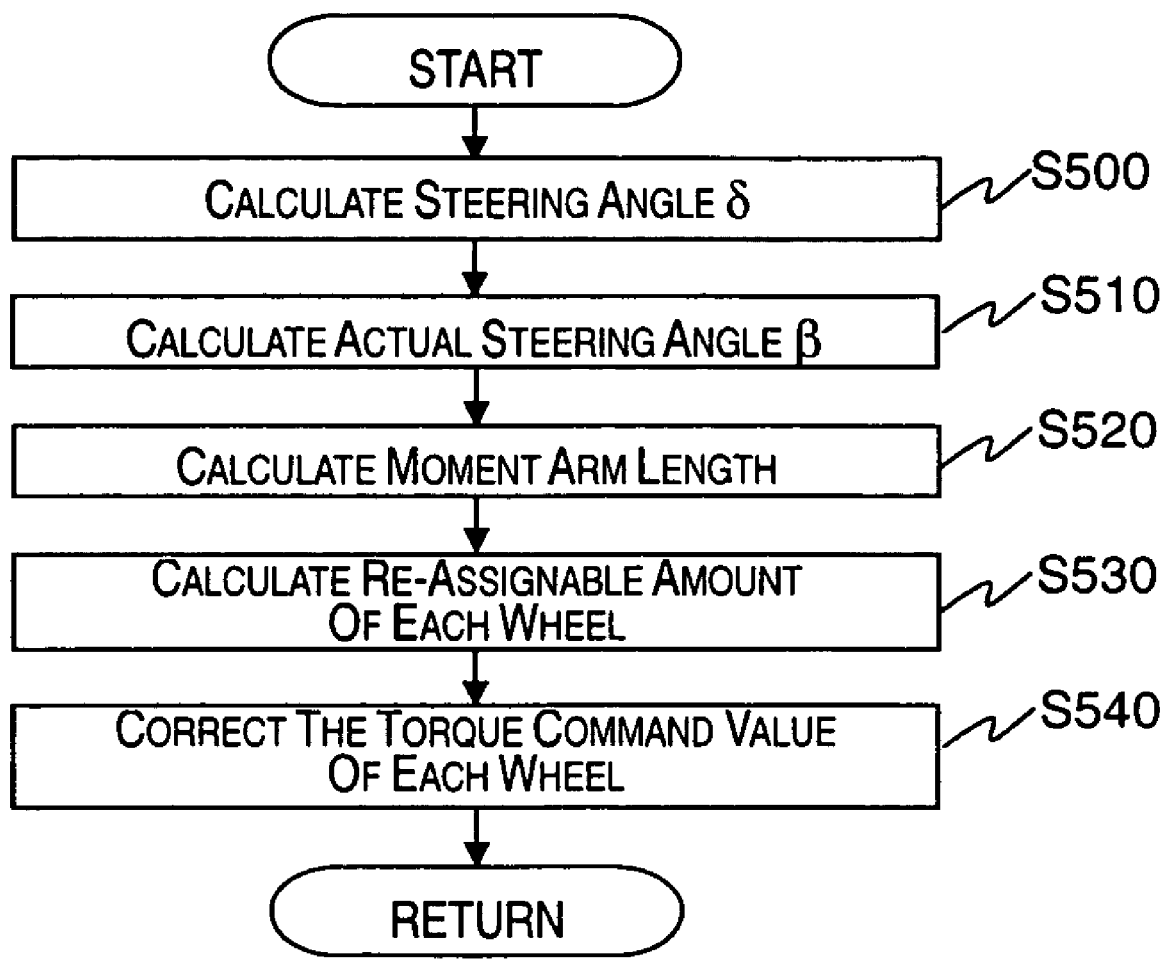
FIG. 8 is a diagram showing alternate processing of the excess distribution computation unit in accordance with the present invention.

Referring now to FIG. 8, alternate processing for the excess distribution computation unit will now be explained in accordance with the present invention. Basically, the alternate processing of FIG. 8 replaces the processing of FIG. 6. In other words, the basic configuration used with this alternate processing of the present embodiment is the same as the first embodiment, but the routine for the excess distribution computation unit is different. Thus, the alternate processing of FIG. 8 uses the components and routines of FIGS. 1-5 and 7. In view of the similarity between these two processing, the components and routines that are identical will be given the same reference numerals. Moreover, the descriptions of the components and routines that are identical may be omitted for the sake of brevity.

Figure 6:
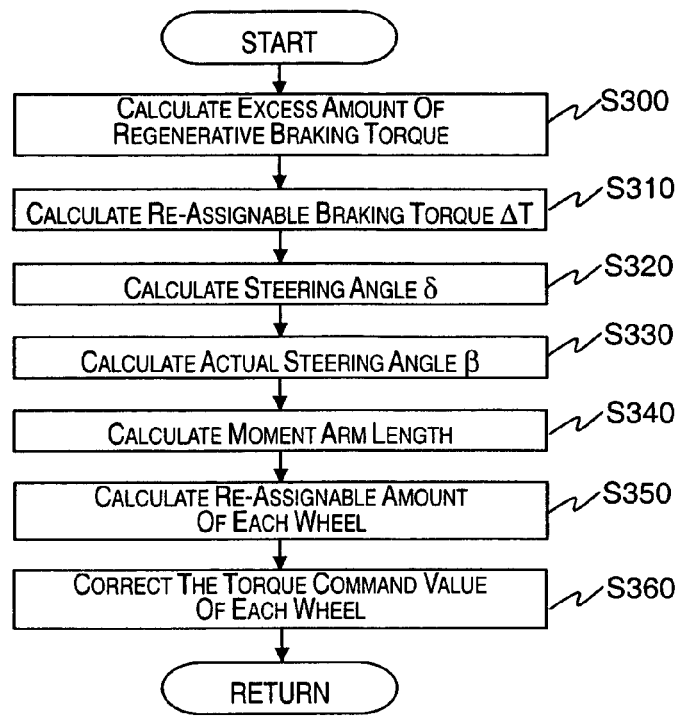
FIG. 6 is a flowchart explaining the control operations executed by the excess distribution computation unit in accordance with the preferred embodiment of the present invention.

In the first processing of FIG. 6, the excess distribution component is configured the reassigned amounts ($F_{FR}$, $F_{FL}$, $F_{RR}$, $F_{RL}$) of braking torque for each wheel are calculated by initially determining an amount $\Delta T$ reassigned to the front and rear wheels, with priority being given to maximizing the regenerative amount. In this alternate processing of FIG. 8, the excess distribution component is configured such that the reassigned amounts ($F_{FR}$, $F_{FL}$, $F_{RR}$, $F_{RL}$) of braking torque for each wheel are calculated to give priority to the prevention of the generation of a new yaw moment.

Next, the routine for the excess distribution computation unit of the present second embodiment is described with reference to FIG. 8.

First, in step S500, the steering angle $\delta$, which constitutes steering information, is calculated from the detection value obtained by measuring the rotation angle and direction on the basis of the edge or level of the output pulse of the encoder or another steering angle sensor in another routine with a shorter computational cycle, and the system advances to step S510.

In step S510, the actual steering angle $\alpha$ of the front wheels is calculated from the steering angle $\delta$ by using the gear ratio of the steering mechanism. Furthermore, in step S520, the direct distances $L_{FL}$, $L_{FR}$, $L_{RL}$, $L_{RR}$ (moment arm lengths) from the center of gravity of the vehicle to the vectors in the direction of rotation of each wheel are calculated based on the Equations (13.1) to (13.4), as set forth above, and the system advances to step S530.

In step S530, a solution is calculated that satisfies the conditions (A) and (B) of the Equations (14) and (15), as set forth above, and the conditions of Equations (18.1) to (18.4) below and produces the maximum reassigned amount ($F_{FR}$+$F_{FL}$) for the front and rear wheels, and the system advances to step S540. The Equations may be simplified by assuming that $F_{RL}=F_{RR}$, for example. In the Equations (18.1) to (18.4), the term R is the effective tire radius.

Constraints on the reassigned amount of braking torque of each wheel (e.g., limit imposed by the lock limit value or the maximum regenerative braking amount of each wheel) are as follows:

$$0 \geq T_{b\_FR} = T_{b0\_FR} - F_{FR} \cdot R \geq F_{LMT\_FR} \cdot R \quad (18.1)$$

$$0 \geq T_{b\_FL} = T_{b0\_FL} - F_{FL} \cdot R \geq F_{LMT\_FL} \cdot R \quad (18.2)$$

$$0 \geq T_{m\_RR} = T_{m0\_RR} + F_{RR} \cdot R \geq \max(F_{LMT\_RR} \cdot R, T_{mmax\_RR}) \quad (18.3)$$

$$0 \geq T_{m\_RL} = T_{m0\_RL} + F_{RL} \cdot R \geq \max(F_{LMT\_RL} \cdot R, T_{mmax\_RL}) \quad (18.4)$$

In the Equations (15.1) to (15.4), the term $F_{LMT\_FR}$ is the lock limit value of the right front wheel, and the term $F_{LMT}$_FL is the lock limit value of the left front wheel.

In step S540, corrections are made and the final regenerative braking torque command value and hydraulic braking torque command value for each wheel are calculated on the basis of the reassigned amounts (see, Equations (16.1), (16.2), (17.1) and (17.2) above). The routine is ended and the system returns to the beginning.

Other configurations of this alternate processing are the same as the first embodiment described above.

Next, the operation, action, effects, and other attributes of this alternate processing are described. In a state of an ideal front and rear braking torque distribution of the braking torque, limitations are imposed on the amount of surplus regenerative braking torque (unused portion with respect to the maximum regenerative braking torque) for each wheel and the distributed frictional braking torque, or on the braking torque (lock limit) that can be transmitted to the road surface, and situations are sometimes encountered in which the occurrence of a new yaw moment cannot be prevented solely with the left and right wheel distribution of the reassigned amounts if the amounts reassigned to the front and rear wheels are given priority and determined in advance.

An effect of the present embodiment is that steering stability can be securely maintained because priority is given to avoiding the occurrence of a yaw moment and because the amounts reassigned to the front and rear wheels are limited while consideration is given to the braking torque (lock limit) that can be transmitted to the road surface. Other operation and effects are the same as in the first embodiment.

Now referring to FIGS. 9-24, six cases of reassigned braking torque amounts ($F_{FR}$, $F_{FL}$, $F_{RR}$, and $F_{RL}$) will be described below in relationship to various vehicle configurations having an internal combustion engine with an automatic transmission operatively coupled to the front wheels FL and FR. These six cases of reassigned braking torque amounts ($F_{FR}$, $F_{FL}$, $F_{RR}$, and $F_{RL}$) uses either the processing of FIG. 6 or the processing of FIG. 8. In other words, either processing, the reassigned amounts ($F_{FR}$, $F_{FL}$, $F_{RR}$, $F_{RL}$) for each wheel are different depending on the vehicle configuration (whether the regenerative braking device is left and right independent, for example) and the restraint conditions (maximum regenerative capacity, lock limit, and other conditions). All the cases are summarized below, including cases in which the front wheels have one or more regenerative braking devices.

Figure 9:
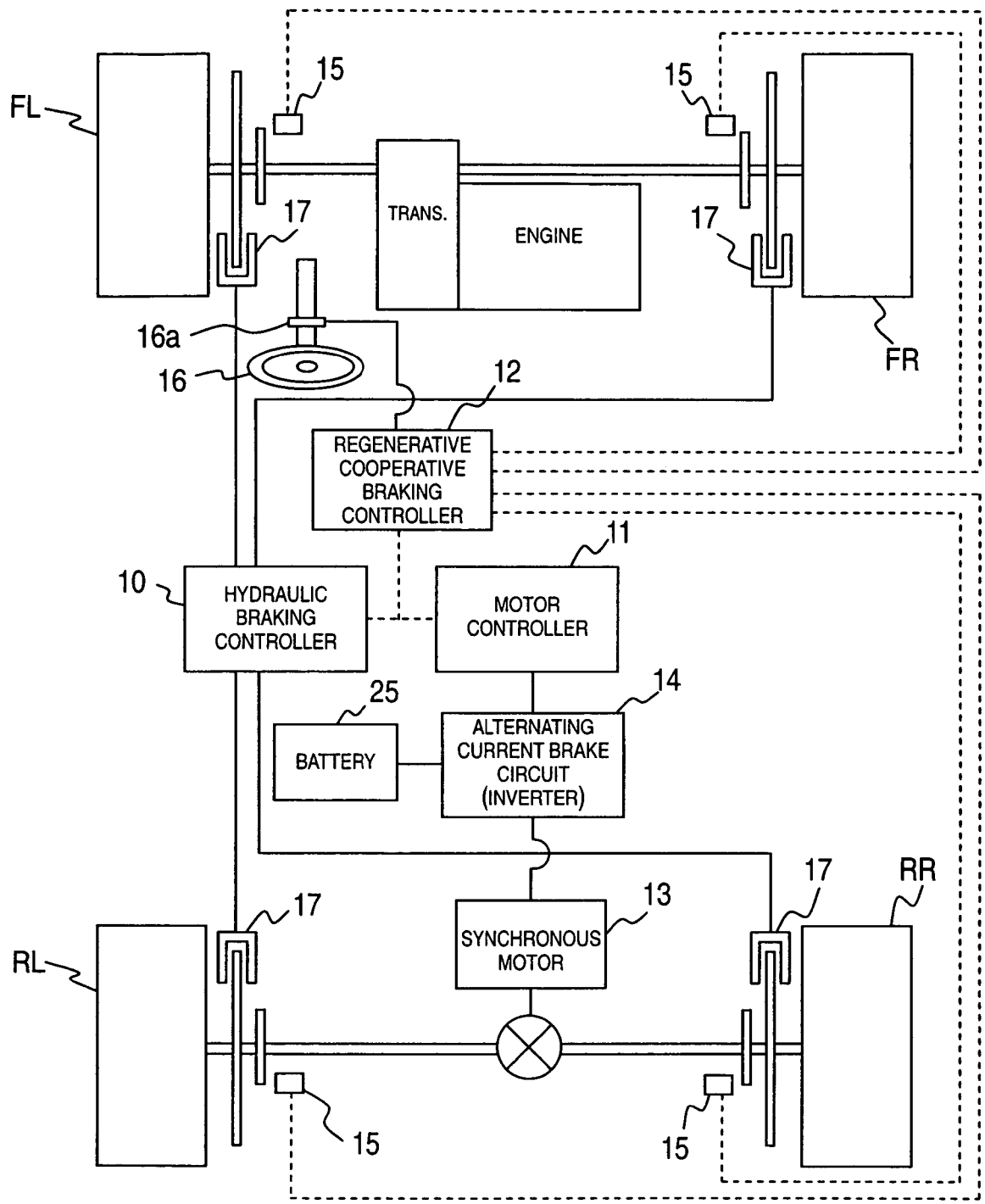
FIG. 9 is a simplified schematic diagram of the vehicle equipped with the vehicle braking control apparatus in accordance with a first case of the present invention in which the vehicle is a front wheel drive with four wheels that have independent frictional braking on each wheel and non-independent regenerative braking on the rear wheels.
Figure 10:
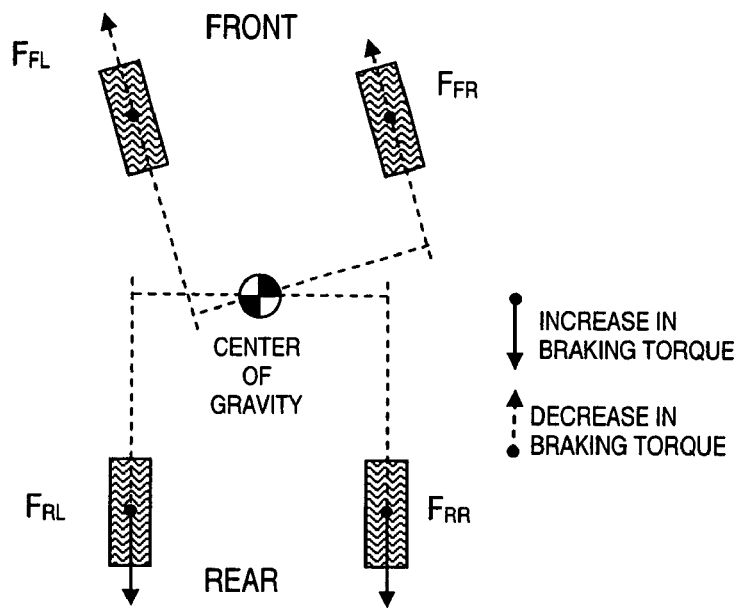
FIG. 10 is a simplified schematic diagram of the vehicle of FIG. 9 turning to the left to show the changes in the moment arm lengths and the changes in reassignment of the braking torques in accordance with the first case.
Figure 11:
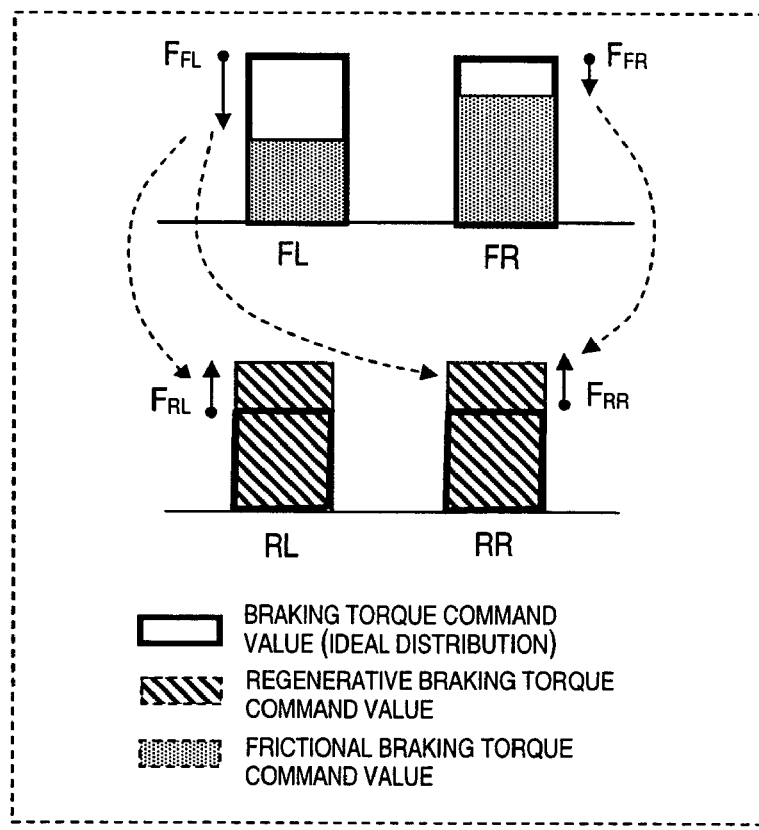
FIG. 11 is a diagram illustrating the reassignment of the braking torques among the four wheel of the vehicle illustrated in FIGS. 9 and 10 in accordance with the first case.

In the first case, as shown in FIGS. 9 to 11, a left and right braking torque distribution is assigned to the front wheels FL and FR to reduce partially or completely a new reassignment-induced yaw moment that is caused by the command values reassigning the front and rear braking torque distribution. In particular, the vehicle in this case is configured as a front wheel drive vehicle with each of the four wheels having independent frictional braking and the rear wheels RL and RR also having left and right non-independent regenerative braking. FIG. 10 is a simplified schematic diagram of the vehicle of FIG. 9 turning to the left to show the changes in the moment arm lengths and the changes in reassignment of the braking torques in accordance with the first case, while FIG. 11 is a diagram illustrating the reassignment of the braking torques among the four wheel of the vehicle illustrated in FIGS. 9 and 10 in accordance with the first case.

In this first case, the front and rear braking torque distribution is varied to increase the braking torques of the rear wheels RL and RR evenly and decrease the braking torques of the front wheels FL and FR unevenly. In particular, in this first case, the left and right braking torque distribution of the frictional braking devices is varied in the front wheels FL and FR, while the left and right braking torque distribution of the rear wheels RL and RR remain equal using non-independent regenerative braking.

In the first case, variation of the assignment of a left and right braking torque difference in the front wheels FL and FR reduces oversteer due to varying the front and rear braking torque distribution where the regenerative braking torques of the rear wheels RL and RR is maximized. While each of the rear wheels RL and RR includes an independent frictional braking device, it will be apparent that in this case it is not necessary to have a vehicle configuration in which the left and right braking torque difference can be assigned the rear wheels RL and RR.

As seen in FIGS. 10 and 11, an example of reassigning braking torque between the front and rear wheels by the above-described control is illustrated in which a left and right braking torque difference is assigned to the front wheels FL and FR and the regenerative braking torques of the rear wheels RL and RR is maximized. When the vehicle is turning left, as shown in FIG. 10, the moment arm on the left front wheel side is made shorter and the moment arm on the right front wheel side is made longer. When command values are reassigned from the steering front wheels to the rear wheels in accordance with the arm length, the occurrence of the new reassignment-induced yaw moment is reduced partially or completely by adjusting the left and right braking torque distribution so that the amount reassigned from the left front wheel side is greater than the amount reassigned to the right front wheel side, as shown in FIG. 11.

When a vehicle is configured as seen in FIG. 9, first the actual steering angle $\alpha$ of the front wheels FL and FR is calculated using the steering gear ratio that is obtained from the steering angle $\delta$ (See step S330 or step S510). The direct distances $L_{FL}$, $L_{FR}$, $L_{RL}$, and $L_{RR}$ (moment arm lengths) are then calculated using Equations (13.1) to (13.4) as set forth above.

Next, the reassigned braking torque amounts $F_{FR}$, $F_{FL}$, $F_{RR}$, and $F_{RL}$ for each wheel that satisfy the above Equations (14) and (15) are calculated as in step S350 or step S530. If absolutely preventing the generation of new yaw moment is given priority, then various restraint conditions are set for limiting the amount of braking torque reassigned to the wheels as indicated in the above Equations (18.1) to (18.4). Thus, the process of calculating the reassigned amounts of braking torque for each wheel is set so as to maximize the amount reassigned from the front wheels FL and FR to the rear wheels RL and RR.

When assigning a left and right braking torque difference solely with the braking torque of the front wheels FL and FR in a vehicle configuration in which the rear wheels have a left/right non-independent regenerative braking torque control device, the reassigned braking torque amounts $F_{RR}$ and $F_{RL}$ of the rear wheels will be equal for the left and right wheels, so the reassigned braking torque amounts $F_{RR}$ and $F_{RL}$ from Equation (14) are calculated with the following Equation, where $\Delta T$ is the amount reassigned to the front and rear wheels.

$$F_{RR} = F_{RL} = \Delta T/2 \tag{19}$$

The following Equations are used to calculate the reassigned braking torque amounts $F_{FR}$ and $F_{FL}$ of the front wheels on the basis of Equations (14), (15) and (19).

$$F_{FR} = \Delta T \cdot \left( \frac{2L_{FL} - L_{RL} + L_{RR}}{2R \cdot (L_{FL} + L_{FR})} \right) \tag{20.1}$$

$$F_{FL} = \Delta T \cdot \left( \frac{2L_{FL} + L_{RL} - L_{RR}}{2R \cdot (L_{FL} + L_{FR})} \right) \tag{20.2}$$

At this point, the amount $\Delta T$ reassigned to the front and rear wheels is not set, if absolutely preventing the generation of new yaw moment is given priority over maximizing regenerative amount. Rather, the amount $\Delta T$ reassigned from the front wheels to the rear wheels in which is adjusted using the conditional expressions set forth in the above Equations (18.1) to (18.4).

In this case, it is a prerequisite that the front and rear braking torque has not reached the lock limit before performing front and rear reassignment in the ideal front and rear braking torque distribution. Reassignment of braking torque from the front wheels to the rear wheels is carried out on the basis of this prerequisite, so the braking torque is reassigned with respect to the ideal front and rear braking torque distribution, the braking torque then decreases in the front wheels and increases in the rear wheels. The conditional expressions (18.1) to (18.4) are simplified as shown in the following Equations.

$$0 \geq T_{b0\_FR} - F_{FR} \cdot R \quad (21.1)$$

$$0 \geq R_{b0\_FL} - F_{FL} \cdot R \quad (21.2)$$

$$T_{m0\_RR} + F_{RR} \cdot R \geq \max(F_{LMT\_RR} \cdot R, T_{mmax\_RR}) \quad (21.3)$$

$$T_{m0\_RL} + F_{RL} \cdot R \geq \max(F_{LMT\_RL} \cdot R, T_{mmax\_RL}) \quad (21.4)$$

The limit values $\Delta T_{lim\_1}$ and $\Delta T_{lim\_2}$ of the amounts reassigned to the front and rear wheels in the conditional expressions (21.1) and (21.2) of the front wheels are calculated with the following Equations, which have been modified by substituting Equation (19) into the conditional expressions (21.1) and (21.2).

$$\Delta T_{\lim\_1} = \frac{(2T_{b0\_FR} \cdot (L_{FL} + L_{FR}))}{(2L_{FL} - L_{RL} + L_{RR})} \quad (22.1)$$

$$\Delta T_{\lim\_2} = \frac{(2T_{b0\_FL} \cdot (L_{FL} + L_{FR}))}{(2L_{FR} + L_{RL} - L_{RR})} \quad (22.2)$$

The limit values $\Delta T_{lim\_3}$ and $\Delta T_{lim\_4}$ of the amounts reassigned to the front and rear wheels in the conditional expressions (21.3) and (21.4) of the front wheels are calculated with the following Equations, which have been modified by substituting Equation (19) into the conditional expressions (21.3) and (21.4).

$$\Delta T_{lim\_3} = 2(\max(F_{LMT\_RR} \cdot R, T_{mmax\_RR}) - T_{m0\_RR}) \quad (23)$$

$$\Delta T_{lim\_4} = 2(\max(F_{LMT\_RL} \cdot R, T_{mmax\_RL}) - T_{m0\_RL}) \quad (24)$$

At this time, the regenerative braking torque control devices are not left and right independent, so the maximum regenerative braking amount and the left and right values of the basic distribution regenerative braking torque command values are equal.

$$T_{mmax\_RR} = T_{mmax\_RL} \quad (25)$$

$$T_{m0\_RR} = T_{m0\_RL} \quad (26)$$

The maximum value $\Delta T$ of the reassigned amount that absolutely does not allow yaw moment to be generated is calculated from the limit value of the front and rear reassigned values calculated from the conditions of each wheel.

$$\Delta T = \max(\Delta T_{lim\_1}, \Delta T_{lim\_2}, \Delta T_{lim\_3}, \Delta T_{lim\_4}) \quad (27)$$

The maximum value $\Delta T$ of the reassigned amounts is substituted into Equations (19), (20.1) and (20.2) to calculate the amounts reassigned to the front and rear wheels.

Now, the final regenerative braking torque command values and the frictional braking torque command values are calculated for each wheel.

Regenerative braking torque command values $$T_{m\_RR} = T_{m0\_RR} + F_{RR} \cdot R \quad (28.1)$$

$$T_{m\_RL} = T_{m0\_RL} + F_{RL} \cdot R \quad (28.2)$$

Frictional braking torque command values $$T_{b\_FR} = T_{b0\_FR} - F_{FR} \cdot R \quad (29.1)$$

$$T_{b\_FL} = T_{b0\_FL} - F_{FL} \cdot R \quad (29.2)$$

$$T_{b\_RR} = 0 \quad (29.3)$$

$$T_{b\_RL} = 0 \quad (29.4)$$

Figure 12:
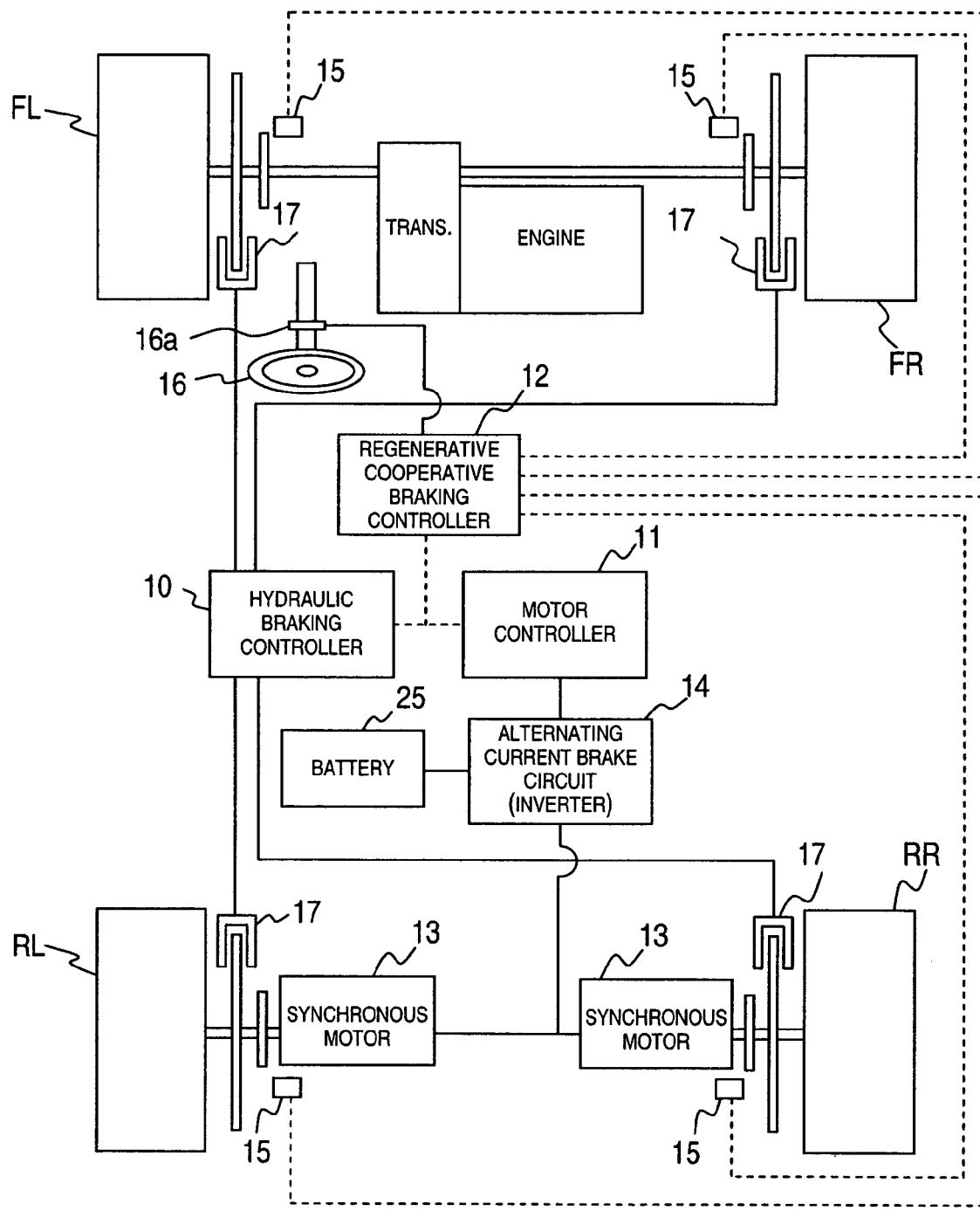
FIG. 12 is a simplified schematic diagram of the vehicle equipped with the vehicle braking control apparatus in accordance with second and third cases of the present invention in which the vehicle is a front wheel drive with four wheels that have independent frictional braking on each wheel and independent regenerative braking on the rear wheels.
Figure 13:
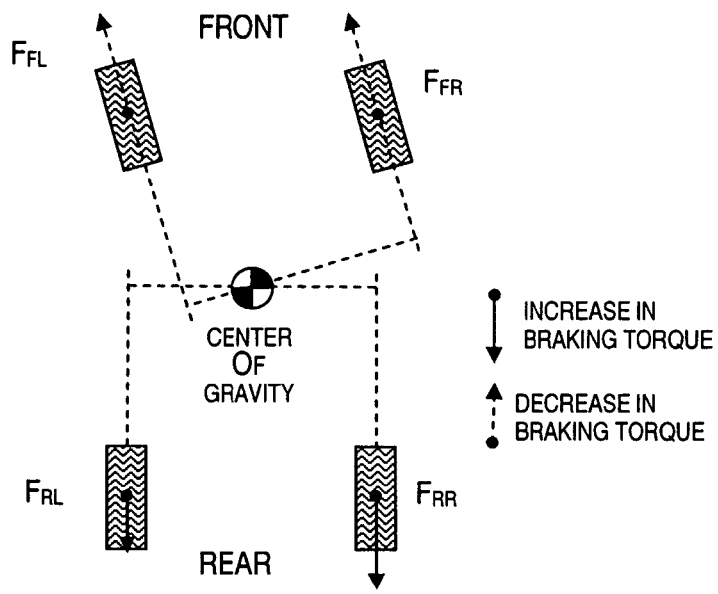
FIG. 13 is a simplified schematic diagram of the vehicle of FIG. 12 turning to the left to show the changes in the moment arm lengths and the changes in reassignment of the braking torques in accordance with the second case.
Figure 14:
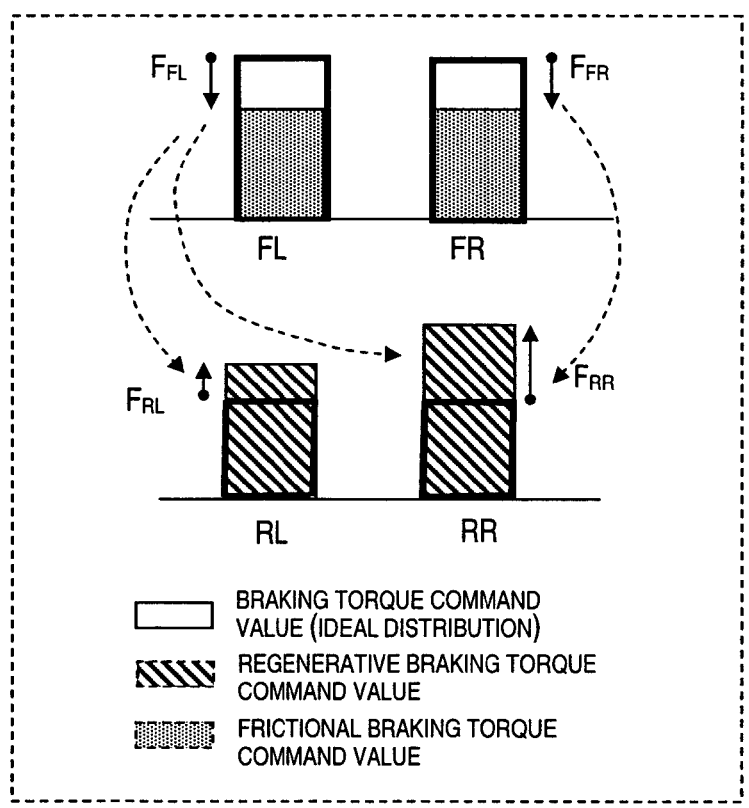
FIG. 14 is a diagram illustrating the reassignment of the braking torques among the four wheel of the vehicle illustrated in FIGS. 12 and 13 in accordance with the second case.

In second case, as shown in FIGS. 12 to 14, a left and right braking torque distribution is assigned to the rear wheels RL and RR to reduce partially or completely a new reassignment-induced yaw moment that is caused by the command values reassigning the front and rear braking torque distribution. In particular, the vehicle in this case is configured as a front wheel drive vehicle with each of the four wheels having independent frictional braking and the rear wheels RL and RR also having left and right independent regenerative braking. FIG. 13 is a simplified schematic diagram of the vehicle of FIG. 12 turning to the left to show the changes in the moment arm lengths and the changes in reassignment of the braking torques in accordance with the second case, while FIG. 14 is a diagram illustrating the reassignment of the braking torques among the four wheel of the vehicle illustrated in FIGS. 12 and 13 in accordance with the second case.

In this second case, the front and rear braking torque distribution is varied to unequally increase the braking torques of the rear wheels RL and RR and equally decrease the braking torques of the front wheels FL and FR. Thus, in this second case, the left and right braking torque distribution of the rear wheels RL and RR is varied in the rear wheels RL and RR, while the left and right braking torque distribution of the frictional braking devices of the front wheels FL and FR remain equal.

In this second case, variation of the assignment of a left and right braking torque difference in the rear wheels RL and RR reduces oversteer due to varying the front and rear braking torque distribution where the regenerative braking torques of the rear wheels RL and RR is maximized. While each of the front wheels FL and FR includes an independent frictional braking device, it will be apparent that in this case it is not necessary to have a vehicle configuration in which the left and right braking torque difference can be assigned the front wheels FL and FR.

As seen in FIGS. 13 and 14, an example of reassigning braking torque between the front and rear wheels by the above-described control is illustrated in which a left and right braking torque difference is assigned to the rear wheels RL and RR and the regenerative braking torques of the rear wheels RL and RR is maximized. However, the left and right braking torque difference of the rear wheels RL and RR can be produced by either solely using the rear wheel frictional braking devices (case 2a), solely using the rear wheel regenerative braking devices (case 2b) or a combination of both the rear wheel frictional braking devices and the rear wheel regenerative braking devices (case 2c).

In any case, when the vehicle is turning left, as shown in FIG. 13, the moment arm on the left front wheel side is made shorter and the moment arm on the right front wheel side is made longer. When command values are reassigned from the steering front wheels to the rear wheels in accordance with the arm length, the occurrence of the new reassignment-induced yaw moment is reduced partially or completely by adjusting the left and right braking torque distribution of the rear wheels RL and RR so that the amount reassigned to the right rear wheel side is greater than the amount reassigned to the left rear wheel side, as shown in FIG. 14.

When a vehicle is configured as seen in FIG. 12, first the actual steering angle $\alpha$ of the front wheels FL and FR is calculated using the steering gear ratio that is obtained from the steering angle $\delta$ (See step S330 or step S510). The direct distances $L_{FL}$, $L_{FR}$, $L_{RL}$, and $L_{RR}$ (moment arm lengths) are then calculated using Equations (13.1) to (13.4) as set forth above.

Next, the reassigned braking torque amounts $F_{FR}$, $F_{FL}$, $F_{RR}$, and $F_{RL}$ for each wheel that satisfy the above Equations

(14) and (15) are calculated as in step S350 or step S530. If absolutely preventing the generation of new yaw moment is given priority, then various restraint conditions are set for limiting the amount of braking torque reassigned to the wheels as indicated in the above Equations (18.1) to (18.4). Thus, the process of calculating the reassigned amounts of braking torque for each wheel is set so as to maximize the amount reassigned from the front wheels FL and FR to the rear wheels RL and RR.

When assigning a left and right braking torque difference to the rear wheels RL and RR, the reassigned braking torque amounts of the front wheels FL and FR will be equal for the left and right wheels, so the amount ΔT of the braking torque reassigned to the front and rear wheels is calculated with the following Equation (30), which is derived from Equation (14). Thus, the following Equations (31.1) and (31.2) are used to calculate the reassigned amounts of braking torque of the rear wheels RL and RR in this case.

$$F_{FR} = F_{FL} = \Delta T/2R \quad (30)$$

$$F_{RL} = \Delta T \cdot \frac{(2L_{RR} + L_{FL} - L_{FR})}{2R \cdot (L_{RL} + L_{RR})} \quad (31.1)$$

$$F_{RR} = \Delta T \cdot \frac{(2L_{RL} - L_{FL} + L_{FR})}{2R \cdot (L_{RL} + L_{RR})} \quad (31.2)$$

At this point, the amount ΔT reassigned to the front and rear wheels is not set, if absolutely preventing the generation of new yaw moment is given priority over maximizing regenerative amount. Rather, the amount ΔT reassigned from the front wheels to the rear wheels in which is adjusted using the conditional expressions set forth in the above Equations (18.1) to (18.4).

In this case, it is a prerequisite that the front and rear braking torque has not reached the lock limit before performing front and rear reassignment in the ideal front and rear braking torque distribution. Reassignment of braking torque from the front wheels to the rear wheels is carried out on the basis of this prerequisite, so the braking torque is reassigned with respect to the ideal front and rear braking torque distribution, the braking torque then decreases in the front wheels and increases in the rear wheels. The conditional expressions (18.1) to (18.4) are simplified as shown in the Equations (21.1) to (21.4) as set forth above.

The limit value $\Delta T_{lim}$ of the amounts reassigned to the front and rear wheels in the conditional expressions (21.1) and (21.2) of the front wheels are calculated with the following Equations (32.1) and (32.2), which have been modified by substituting Equation $F_{FR}=F_{FL}=\Delta T/2$ into the conditional expressions (21.1) and (21.2). The ideal distributions $T_{b0\_FR}$ and $T_{b0\_FL}$ of the front wheels FL and FR are equal so the following Equations are used in this case.

$$T_{b0\_FR} = T_{b0\_FL} \quad (32.1)$$

$$\Delta T_{lim} = 2T_{b0\_FR} = 2T_{b0\_FL} \quad (32.2)$$

The limit value of the reassigned amounts derived from the maximum regenerative braking amount and the lock limit of the rear wheels are calculated with Equations (31.1) and (31.2) and the conditional expressions of Equations (18.3) and (18.4).

Limit values of the reassigned amounts due to the limit of the maximum regenerative braking amount are calculated as follows:

$$\Delta T_{lim\_tmmax1} = \frac{2(L_{RL} + L_{RR}) \cdot (T_{mmax\_RR} - T_{d0\_RR})}{(2L_{RL} - L_{FL} + L_{FR})} \quad (33.1)$$

$$\Delta T_{lim\_tmmax2} = \frac{2(L_{RL} + L_{RR}) \cdot (T_{mmax\_RL} - T_{d0\_RL})}{(2L_{RR} + L_{FL} - L_{FR})} \quad (33.2)$$

Limit values of the reassigned amounts due to the limit of the lock limit are calculated as follows:

$$\Delta T_{lim\_flim1} = \frac{2(L_{RL} + L_{RR}) \cdot (F_{LMT\_RR} \cdot R - T_{d0\_RR})}{(2L_{RL} - L_{FL} + L_{FR})} \quad (34.1)$$

$$\Delta T_{lim\_flim2} = \frac{2(L_{RL} + L_{RR}) \cdot (F_{LMT\_RL} \cdot R - T_{d0\_RL})}{(2L_{RR} + L_{FL} - L_{FR})} \quad (34.2)$$

The restraint conditions for the amount of braking torque reassigned to the rear wheels are different for the situation (case 2a) in which a left and right braking torque difference is assigned solely with frictional braking, the situation (case 2b) in which the left and right braking torque difference is assigned solely with regenerative braking, and the situation (case 2c) in which the left and right braking torque difference is assigned with both frictional braking and regenerative braking. Therefore, the method for calculating the reassigned amount whereby yaw moment is not generated in each of the cases is described.

First, the situation (case 2a) will be discussed in which the left and right braking torque difference is assigned solely with the frictional braking of the rear wheels. When assigning a left and right braking torque difference in order to inhibit yaw moment in the oversteer direction produced by reassigning the amount of braking torque from the front wheels to the rear wheels during a turning and braking condition, the wheels on the outside of the turn experience a larger braking torque than the wheels on the inside of the turn as an absolute value. The limit of the wheels on the outside of the turn is such that the sum of the braking torques produced by the left and right independent regenerative braking torque and the frictional braking torque does not exceed the lock limit value. Frictional braking is also added, so the limit at this time may exceed the maximum regenerative braking amount. The wheels on the inside of the turn are not required to exceed the maximum regenerative braking amount, and the limit does not exceed the maximum regenerative braking amount and the lock limit value.

The maximum value ΔT of the amount reassigned thereby is calculated with the following Equations.

When turning left $$\Delta T = \max(\Delta T_{lim}, \Delta T_{lim\_tmmax2}, \Delta T_{lim\_flim1}, \Delta T_{lim\_flim2}) \quad (35)$$

When turning right $$\Delta T = \max(\Delta T_{lim}, \Delta T_{lim\_tmmax1}, \Delta T_{lim\_flim1}, \Delta T_{lim\_flim2}) \quad (36)$$

The situation (case 2b) will be discussed in which the left and right braking torque difference is assigned solely with the regenerative braking of the rear wheels. When assigning a left and right braking torque difference solely with the regenerative braking of the rear wheels, neither of the left and right rear wheels exceeds the maximum regenerative braking amount and the lock limit value, and the maximum value ΔT of the value reassigned thereby is calculated with the following Equation.

$$\Delta T = \max(\Delta T_{lim}, \min(\Delta T_{lim\_tmmax1}, \Delta T_{lim\_flim1}, \Delta T_{lim\_tmmax2}), \Delta T_{lim\_flim1}, \Delta T_{lim\_flim2}) \quad (37)$$

The situation (case 2c) will be discussed in which the left and right braking torque difference is assigned with both the frictional braking and the regenerative braking of the rear wheels. When assigning a left and right braking torque difference with both the frictional braking and the regenerative braking of the rear wheels, the reassigned amount $\Delta T$ reaches a maximum if one of the left and right rear wheels is the maximum regenerative braking amount and if the other is the sum of the maximum regenerative braking amount and the frictional braking.

$$\Delta T = \max(\Delta T_{lim}, \min(\Delta T_{lim\_tmmax1}, \Delta T_{lim\_tmmax2}), \Delta T_{lim\_flim1}, \Delta T_{lim\_flim2}) \quad (38)$$

The amount of braking reassigned to each wheel is calculated with the maximum $\Delta T$ of the reassigned amount using Equations (30), (31.1) and (31.2) and (15) that were previously mentioned.

Now, the final regenerative braking torque command values and the frictional braking torque command values are calculated for each wheel.

Regenerative braking torque command values $$T_{m\_RR} = T_{m\_RL} = T_{d0\_RR} + F_{RR} \cdot R \quad (39)$$

Frictional braking torque command values $$T_{b\_FR} = T_{b0\_FR} - F_{FR} \cdot R \quad (40.1)$$

$$T_{b\_FL} = T_{b0\_FL} - F_{FL} \cdot R \quad (40.2)$$

$$T_{b\_RR} = T_{b0\_RR} + F_{RR} \cdot R - T_{m\_RR} \quad (40.3)$$

$$T_{b\_RL} = T_{b0\_RL} + F_{RL} \cdot R - T_{m\_RL} \quad (40.4)$$

Figure 15:
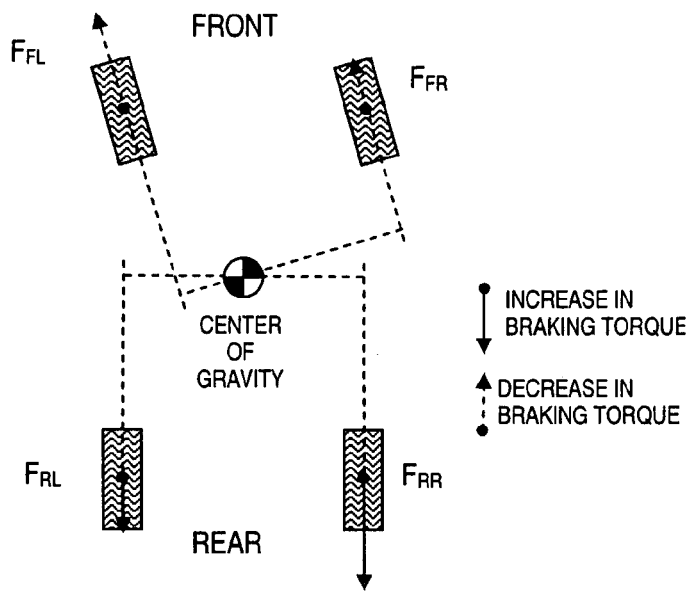
FIG. 15 is a simplified schematic diagram of the vehicle of FIG. 12 turning to the left to show the changes in the moment arm lengths and the changes in reassignment of the braking torques in accordance with the third case.
Figure 16:
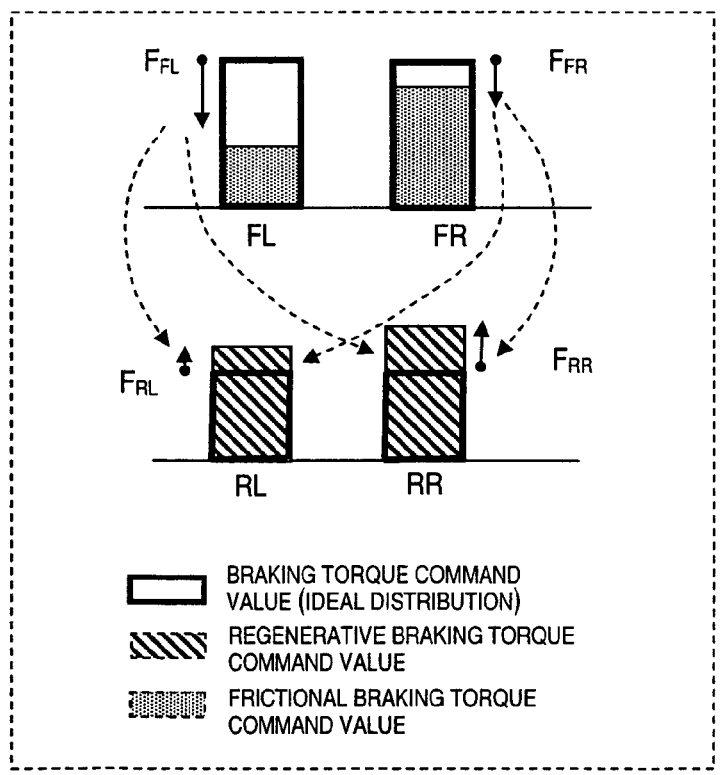
FIG. 16 is a diagram illustrating the reassignment of the braking torques among the four wheel of the vehicle illustrated in FIGS. 12 and 15 in accordance with the third case.

In third case, as shown in FIGS. 12, 15 and 16, a left and right braking torque distribution is assigned to both the front and rear wheels FL, FR, RL and RR to reduce partially or completely a new reassignment-induced yaw moment that is caused by the command values reassigning the front and rear braking torque distribution.

In particular, the vehicle in this case is configured as a front wheel drive vehicle with each of the four wheels having independent frictional braking and the rear wheels RL and RR also having left and right independent regenerative braking as seen in FIG. 12. FIG. 15 is a simplified schematic diagram of the vehicle of FIG. 12 turning to the left to show the changes in the moment arm lengths and the changes in reassignment of the braking torques in accordance with the third case, while FIG. 16 is a diagram illustrating the reassignment of the braking torques among the four wheel of the vehicle illustrated in FIG. 12 in accordance with the third case.

In the third case, the front and rear braking torque distribution is varied to unequally increase the braking torques of the rear wheels RL and RR and unequally decrease the braking torques of the front wheels FL and FR. Thus, in this third case, the left and right braking torque distributions of both the front and rear wheels FL, FR, RL and RR are varied in both the front and rear wheels FL, FR, RL and RR.

In this third case, variation of the assignment of the left and right braking torque difference in both the front and rear wheels FL, FR, RL and RR reduces oversteer due to varying the front and rear braking torque distribution to greater extent than the first and second cases. Also the regenerative braking torques of the rear wheels RL and RR is maximized.

As seen in FIGS. 15 and 16, an example of reassigning braking torque between the front and rear wheels by the above-described control is illustrated in which a left and right braking torque difference is assigned to both the front and rear wheels FL, FR, RL and RR and the regenerative braking torques of the rear wheels RL and RR is maximized. However, the left and right braking torque difference of the rear wheels RL and RR can be produced by either solely using the rear wheel frictional braking devices (case 3a), solely using the rear wheel regenerative braking devices (case 3b) or a combination of both the rear wheel frictional braking devices and the rear wheel regenerative braking devices (case 3c).

In any case, when the vehicle is turning left, as shown in FIG. 15, the moment arm on the left front wheel side is made shorter and the moment arm on the right front wheel side is made longer. When command values are reassigned from the steering front wheels to the rear wheels in accordance with the arm length, the occurrence of the new reassignment-induced yaw moment is reduced partially or completely by adjusting the left and right braking torque distributions of both the front and rear wheels FL, FR, RL and RR so that the amount reassigned to the right rear wheel side is greater than the amount reassigned to the left rear wheel side, as shown in FIG. 16.

When a vehicle is configured as seen in FIG. 12, first the actual steering angle $\alpha$ of the front wheels FL and FR is calculated using the steering gear ratio that is obtained from the steering angle $\delta$ (See step S330 or step S510). The direct distances $L_{FL}$, $L_{FR}$, $L_{RL}$, and $L_{RR}$ (moment arm lengths) are then calculated using Equations (13.1) to (13.4) as set forth above.

Next, the reassigned braking torque amounts $F_{FR}$, $F_{FL}$, $F_{RR}$, and $F_{RL}$ for each wheel that satisfy the above Equations (14) and (15) are calculated as in step S350 or step S530. If absolutely preventing the generation of new yaw moment is given priority, then various restraint conditions are set for limiting the amount of braking torque reassigned to the wheels as indicated in the above Equations (18.1) to (18.4). Thus, the process of calculating the reassigned amounts of braking torque for each wheel is set so as to maximize the amount reassigned from the front wheels FL and FR to the rear wheels RL and RR.

When assigning a left and right braking torque difference with the left and right wheels, the following Equation (41) is satisfied, where $\beta$ is the ratio of the left and right braking torque difference of the amount reassigned to the front wheels with respect to the total of the left and right braking torque difference of the front wheels and left and right braking torque difference of the rear wheels, and $(1-\beta)$ is the ratio of the left and right braking torque difference of the amount reassigned to the rear wheels.

$$(F_{FR} - F_{FL}) \cdot (1-\beta) = (F_{RR} - F_{RL}) \cdot \beta \quad (41)$$

The term $\beta$ can be a fixed value that is set in accordance with vehicle characteristics, or can be allowed to vary in accordance with steering and other behaviors of the vehicle.

The following Equations are derived from Equations (14), (15), and (41), and are used to calculate the reassigned amounts of braking torque of the front and rear wheels.

$$F_{FR} = \frac{\Delta T \cdot (2\beta \cdot (L_{FL} + L_{RR}) - (L_{RL} + L_{RR}))}{(2R \cdot (\beta \cdot (L_{FL} + L_{FR} + L_{RL} + L_{RR}) - (L_{RL} + L_{RR}))} \quad (42.1)$$

$$F_{FL} = \frac{\Delta T \cdot (2\beta \cdot (L_{FR} + L_{RL}) - (L_{RL} + L_{RR}))}{(2R \cdot (\beta \cdot (L_{FL} + L_{FR} + L_{RL} + L_{RR}) - (L_{RL} + L_{RR}))} \quad (42.2)$$

$$F_{RR} = \frac{\Delta T \cdot (2\beta \cdot (L_{FR} + L_{RL}) - (2L_{RL} - L_{FL} + L_{FR}))}{(2R \cdot (\beta \cdot (L_{FL} + L_{FR} + L_{RL} + L_{RR}) - (L_{RL} + L_{RR}))} \quad (42.3)$$

-continued $$F_{RL} = \frac{\Delta T \cdot (2\beta \cdot (L_{FL} + L_{RR}) - (2L_{RR} + L_{FL} - L_{FR}))}{(2R \cdot (\beta \cdot (L_{FL} + L_{FR} + L_{RL} + L_{RR}) - (L_{RL} + L_{RR}))} \quad (42.4)$$

At this point, the amount $\Delta T$ reassigned to the front and rear wheels is not set if absolutely preventing the generation of new yaw moment is given priority over maximizing regenerative amount. Rather, the amount $\Delta T$ reassigned from the front wheels to the rear wheels to maximizes the regenerated amount is calculated with the following method using the conditional expressions set forth in the above Equations (18.1) to (18.4).

In this case, it is a prerequisite that the front and rear braking torque has not reached the lock limit before performing front and rear reassignment in the ideal front and rear braking torque distribution. Reassignment of braking torque from the front wheels to the rear wheels is carried out on the basis of this prerequisite, so the braking torque is reassigned with respect to the ideal distribution, the braking torque then decreases in the front wheels and increases in the rear wheels, and the conditional expressions (18.1) to (18.4) are simplified as shown in the above Equations (21.1) to (21.4).

The limit values. $\Delta T_{lim\_1}$ and $\Delta T_{lim\_2}$ of the amounts reassigned to the front and rear wheels in the conditional expressions (21.1) and (21.2) of the front wheels are calculated with the following Equations, which have been modified by substituting Equations (42.1) and (42.2) into the conditional expressions (21.1) and (21.2).

$$\Delta T_{lim1} = \frac{2T_{b0\_FR}(\beta \cdot (L_{FL} + L_{FR} + L_{RL} + L_{RR}) - (L_{RL} + L_{RR}))}{(2\beta \cdot (L_{FL} + L_{RL}) - (L_{RL} + L_{RR}))} \quad (43.1)$$

$$\Delta T_{lim2} = \frac{2T_{b0\_FL}(\beta \cdot (L_{FL} + L_{FR} + L_{RL} + L_{RR}) - (L_{RL} + L_{RR}))}{(2\beta \cdot (L_{FR} + L_{RL}) - (L_{RL} + L_{RR}))} \quad (43.2)$$

The limit values of the reassigned amounts derived from the maximum regenerative braking amount and the lock limit of the rear wheels are calculated with Equations (42.3) and (42.4) and the conditional expressions (21.3) and (21.4).

The limit values of the reassigned amount due to the limit of the maximum regenerative braking amount are calculated as follows:

$$\Delta T_{lim\_tmmax1} = \frac{2(\beta \cdot (L_{FL} + L_{FR} + L_{RL} + L_{RR}) - (L_{RL} + L_{RR})) \cdot (T_{mmax\_RR} - T_{d0\_RR})}{(2\beta \cdot (L_{FR} + L_{RL}) - (2L_{RL} - L_{FL} + L_{FR}))} \quad (44.1)$$

$$\Delta T_{lim\_tmmax2} = \frac{2(\beta \cdot (L_{FL} + L_{FR} + L_{RL} + L_{RR}) - (L_{RL} + L_{RR})) \cdot (T_{mmax\_RL} - T_{d0\_RL})}{(2\beta \cdot (L_{FL} + L_{RR}) - (2L_{RR} + L_{FL} - L_{FR}))} \quad (44.2)$$

The limit values of the reassigned amount due to the limit of the lock limit are calculated as follow:

$$\Delta T_{lim\_flim1} = \frac{2(\beta \cdot (L_{FL} + L_{FR} + L_{RL} + L_{RR}) - (L_{RL} + L_{RR})) \cdot (F_{LMT\_RR} \cdot R - T_{d0\_RR})}{(2\beta \cdot (L_{FR} + L_{RL}) - (2L_{RL} - L_{FL} + L_{FR}))} \quad (45.1)$$

-continued $$\Delta T_{lim\_flim2} = \frac{2(\beta \cdot (L_{FL} + L_{FR} + L_{RL} + L_{RR}) - (L_{RL} + L_{RR})) \cdot (F_{LMT\_RL} \cdot R - T_{d0\_RL})}{(2\beta \cdot (L_{FL} + L_{RR}) - (2L_{RR} + L_{FL} - L_{FR}))} \quad (45.2)$$

Similar to the second case, discussed above, the restraint conditions for the amount of braking torque reassigned to the rear wheels are different for the situation (case 3$a$) in which a left and right braking torque difference is assigned solely with frictional braking, the situation (case 3$b$) in which the left and right braking torque difference is assigned solely with regenerative braking, and the situation (case 3$c$) in which the left and right braking torque difference is assigned with both frictional braking and regenerative braking. The method for calculating the reassigned amount whereby yaw moment is not generated for each of the cases 3$a$ to 3$c$ is the same as the methods for calculating the reassigned amount used in cases 2$a$ to 2$c$. Since these methods for calculating the reassigned amount are discussed above, they will not be repeated.

Now, the final regenerative braking torque command values and the frictional braking torque command values are calculated for each wheel.

Regenerative braking torque command values:

$$T_{m\_RR} = \max(T_{d0\_RR} + F_{RR} \cdot R, T_{mmax\_RR}) \quad (46.1)$$

$$T_{m\_RL} = \max(T_{d0\_RL} + F_{RL} \cdot R, T_{mmax\_RL}) \quad (46.2)$$

Frictional braking torque command values:

$$T_{b\_FR} = T_{b0\_FR} + F_{\_FR} \cdot R \quad (47.1)$$

$$T_{b\_FL} = T_{b0\_FL} + F_{FL} \cdot R \quad (47.2)$$

$$T_{b\_RR} = T_{d0\_RR} + F_{RR} \cdot R - T_{m\_RR} \quad (47.3)$$

$$T_{b\_RL} = T_{d0\_RL} + F_{RL} \cdot R - T_{m\_RL} \quad (47.4)$$

Now referring to FIGS. 17 to 24, the fourth to sixth cases illustrate vehicle configurations in which the front wheels FL and FR have one or more regenerative braking devices. In these cases, the front and rear braking torque distribution is varied to increase the braking torques of the front wheels FL and FR and decrease the braking torques of the rear wheels RL and RR. The left and right braking torque distribution is varied differently depending on the vehicle configuration. In view of the similarity between the first to third cases and the fourth to sixth cases, respectively, the fourth to sixth cases will not be discussed in as much detail.

Figure 17:
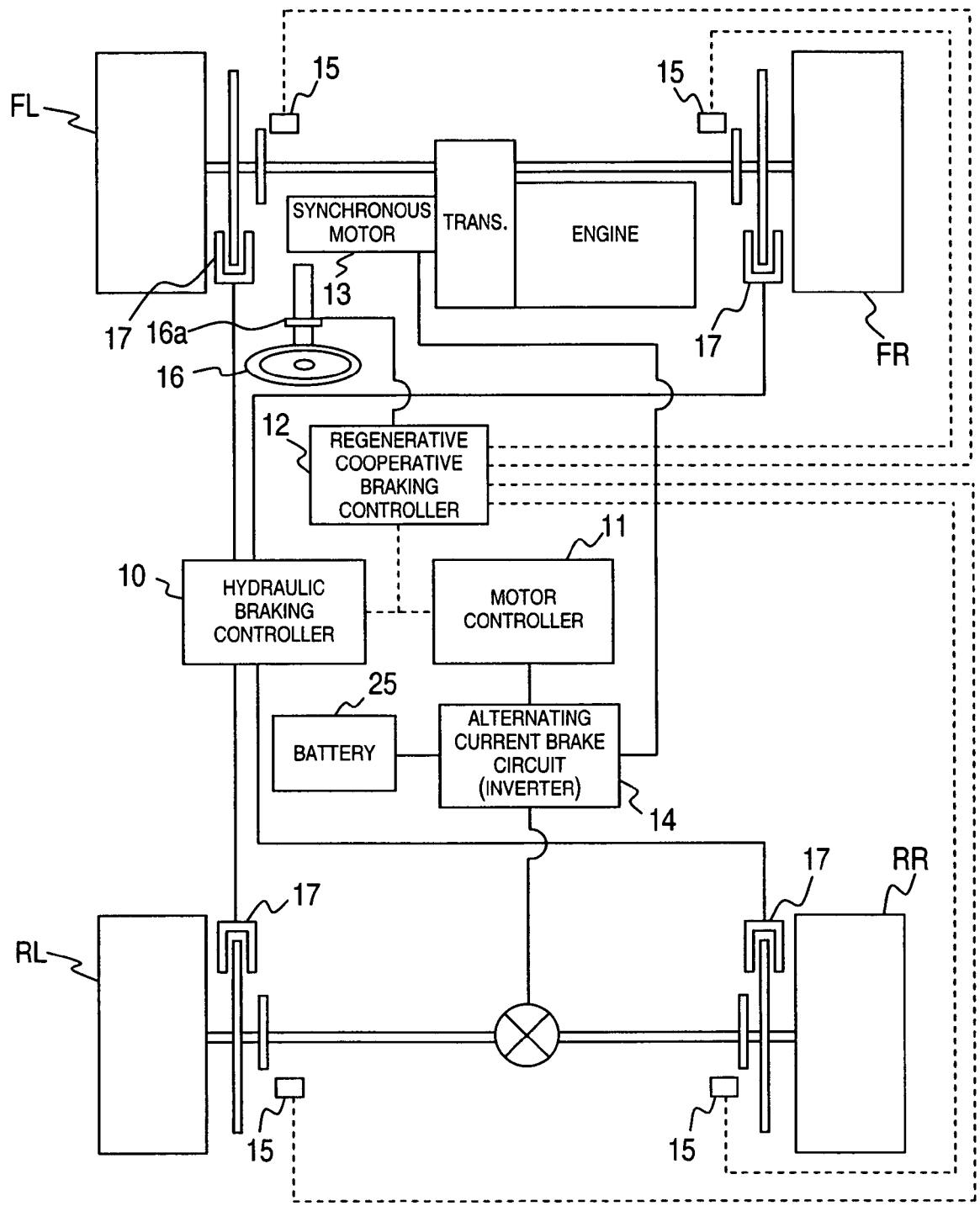
FIG. 17 is a simplified schematic diagram of the vehicle equipped with the vehicle braking control apparatus in accordance with a fourth case of the present invention in which the vehicle is a front wheel drive with four wheels that have independent frictional braking on each wheel and non-independent regenerative braking on the front wheels.
Figure 18:
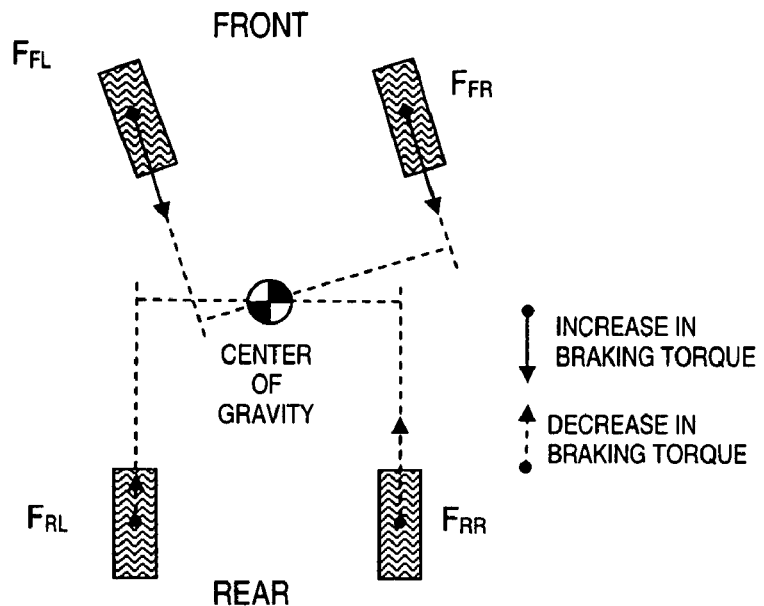
FIG. 18 is a simplified schematic diagram of the vehicle of FIG. 17 turning to the left to show the changes in the moment arm lengths and the changes in reassignment of the braking torques in accordance with the fourth case.
Figure 19:
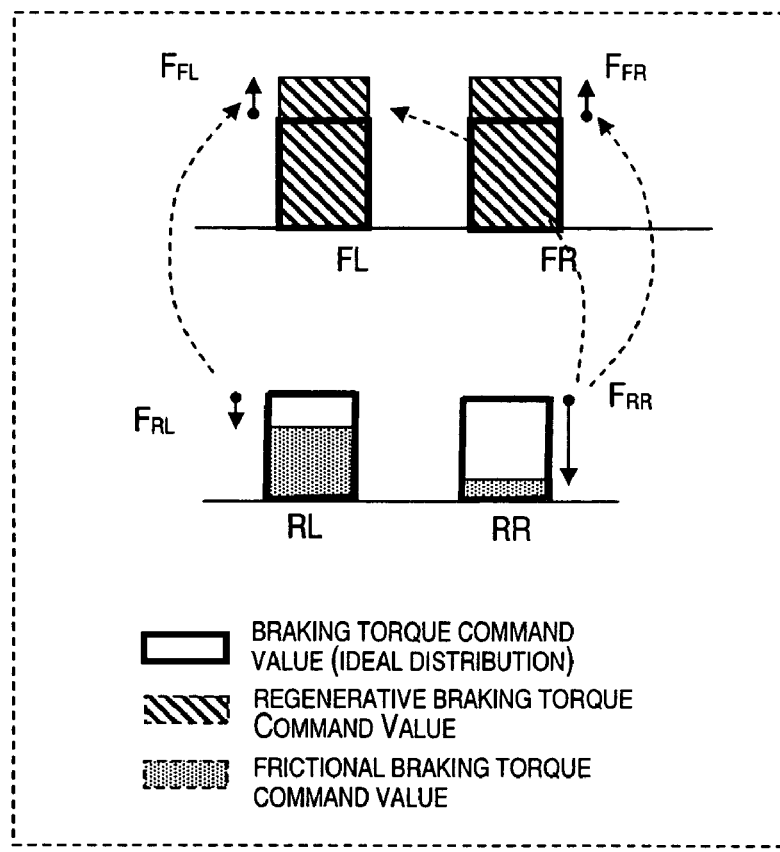
FIG. 19 is a diagram illustrating the reassignment of the braking torques among the four wheel of the vehicle illustrated in FIGS. 17 and 18 in accordance with the fourth case.

In the fourth case, as shown in FIGS. 17 to 19, a left and right braking torque distribution is assigned to the rear wheels RL and RR to reduce partially or completely a new reassignment-induced yaw moment that is caused by the command values reassigning the front and rear braking torque distribution. In particular, the vehicle in this case is configured as a front wheel drive vehicle with each of the four wheels having independent frictional braking and the front wheels FL and FR also having left and right non-independent regenerative braking. FIG. 18 is a simplified schematic diagram of the vehicle of FIG. 17 turning to the left to show the changes in the moment arm lengths and the changes in reassignment of the braking torques in accordance with the fourth case, while FIG. 19 is a diagram illustrating the reassignment of the braking torques among the four wheel of the vehicle illustrated in FIGS. 17 and 18 in accordance with the fourth case.

In this fourth case, the front and rear braking torque distribution is varied to increase the braking torques of the front wheels FL and FR evenly and decrease the braking torques of the rear wheels RL and RR unevenly. In particular, in this fourth case, the left and right braking torque distribution of the frictional braking devices is varied in the rear wheels RL and RR, while the left and right braking torque distribution of the front wheels FL and FR remain equal using non-independent regenerative braking.

In the fourth case, variation of the assignment of a left and right braking torque difference in the rear wheels RL and RR reduces understeer due to varying the front and rear braking torque distribution where the regenerative braking torques of the front wheels FL and FR is maximized. While each of front wheels FL and FR includes an independent frictional braking device, it will be apparent that in this case it is not necessary to have a vehicle configuration in which a left and right braking torque difference can be assigned between the front wheels FL and FR.

As seen in FIGS. 18 and 19, an example of reassigning braking torque between the front and rear wheels by the above-described control is illustrated in which a left and right braking torque difference is assigned to the rear wheels RL and RR and the regenerative braking torques of the front wheels FL and FR is maximized. When the vehicle is turning left, as shown in FIG. 18, the moment arm on the left front wheel side is made shorter and the moment arm on the right front wheel side is made longer. When command values are reassigned from the rear wheels RL and RR to the front wheels FL and FR in accordance with the arm length, the occurrence of the new reassignment-induced yaw moment is reduced partially or completely by adjusting the left and right braking torque distribution so that the amount reassigned from the right rear wheel side is greater than the amount reassigned to the left rear wheel side, as shown in FIG. 19.

Figure 3:
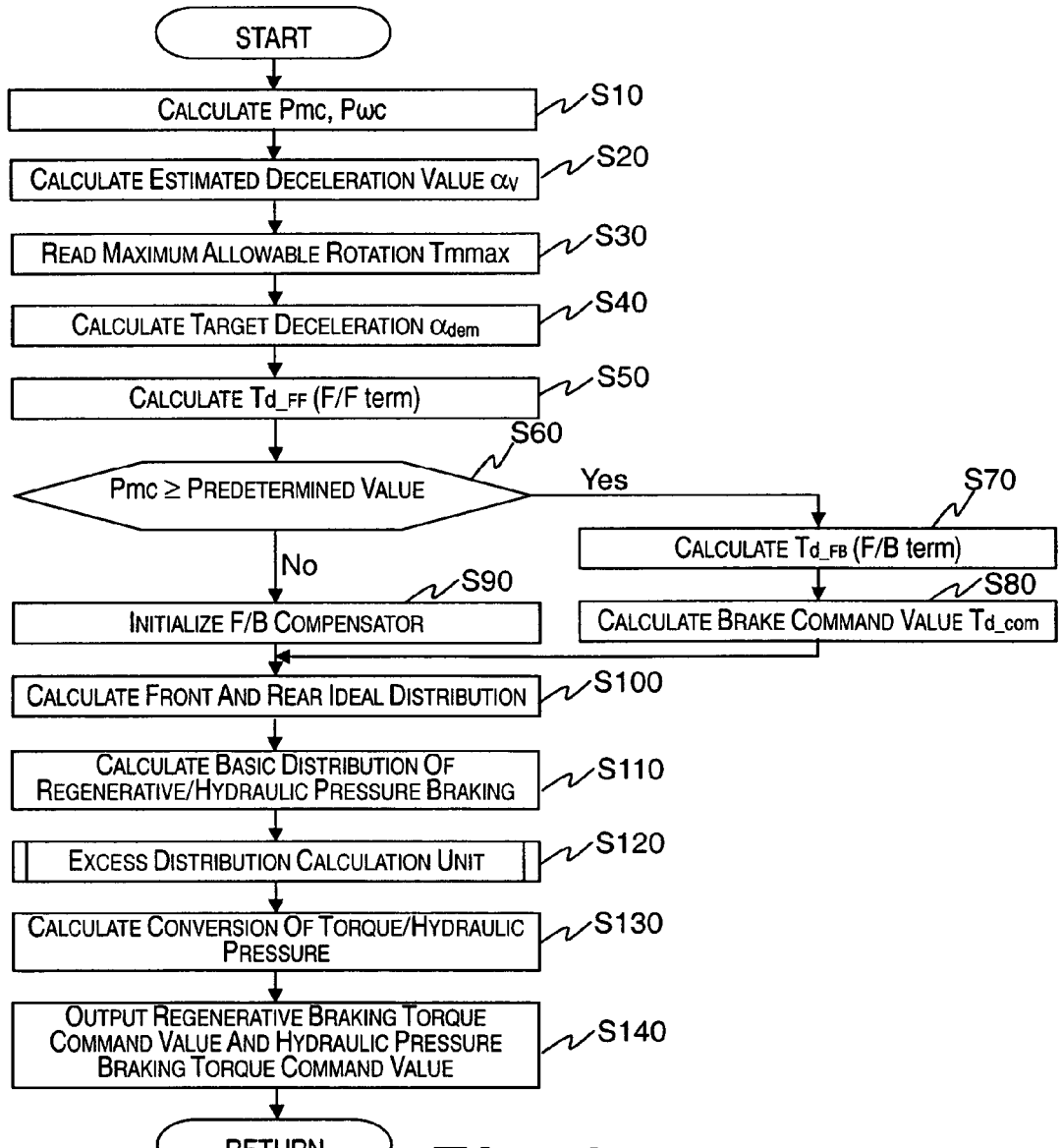
FIG. 3 is a flowchart explaining the control operations executed by the regenerative cooperative braking controller illustrated in FIG. 2 to describing the routine for the regenerative cooperative braking controller in accordance with the preferred embodiment of the present invention.

Basically, either the processing of FIGS. 3 and 6 or the processing of FIGS. 3 and 8 can be used to reassign braking torque between the front and rear wheels and a left and right braking torque difference in the rear wheels RL and RR for the vehicle configuration of the fourth case as seen in FIG. 17. Thus, the specific processing for the reassignment of braking torques for the fourth case will not be further discussed herein.

Figure 20:
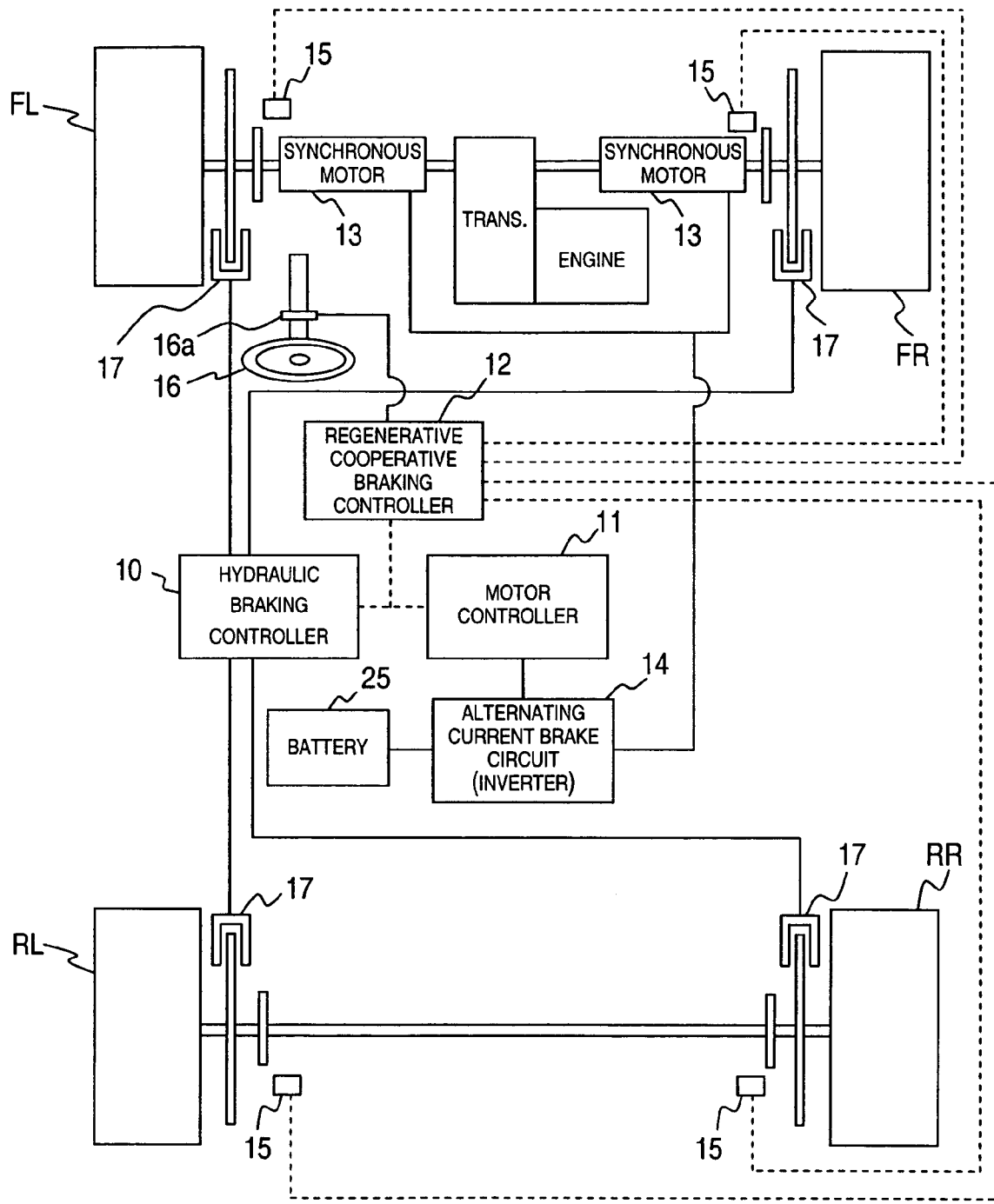
FIG. 20 is a simplified schematic diagram of the vehicle equipped with the vehicle braking control apparatus in accordance with fifth and sixth cases of the present invention in which the vehicle is a front wheel drive with four wheels that have independent frictional braking on each wheel and independent regenerative braking on the front wheels.
Figure 21:
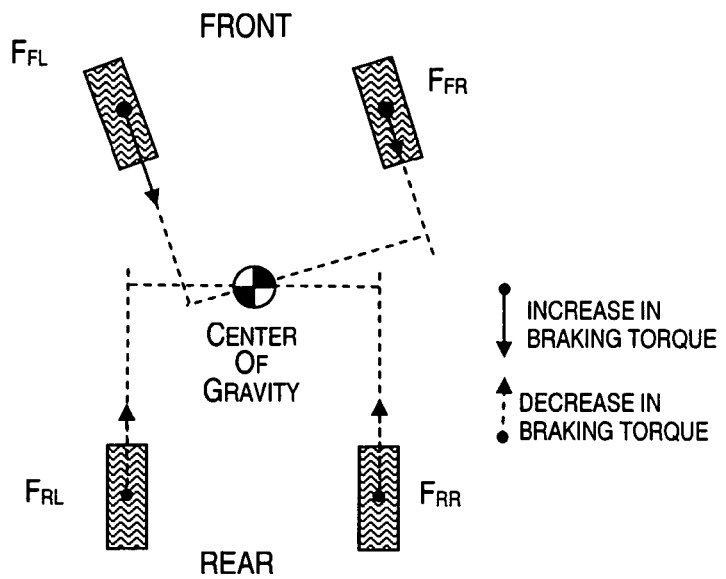
FIG. 21 is a simplified schematic diagram of the vehicle of FIG. 20 turning to the left to show the changes in the moment arm lengths and the changes in reassignment of the braking torques in accordance with the fifth case.
Figure 22:
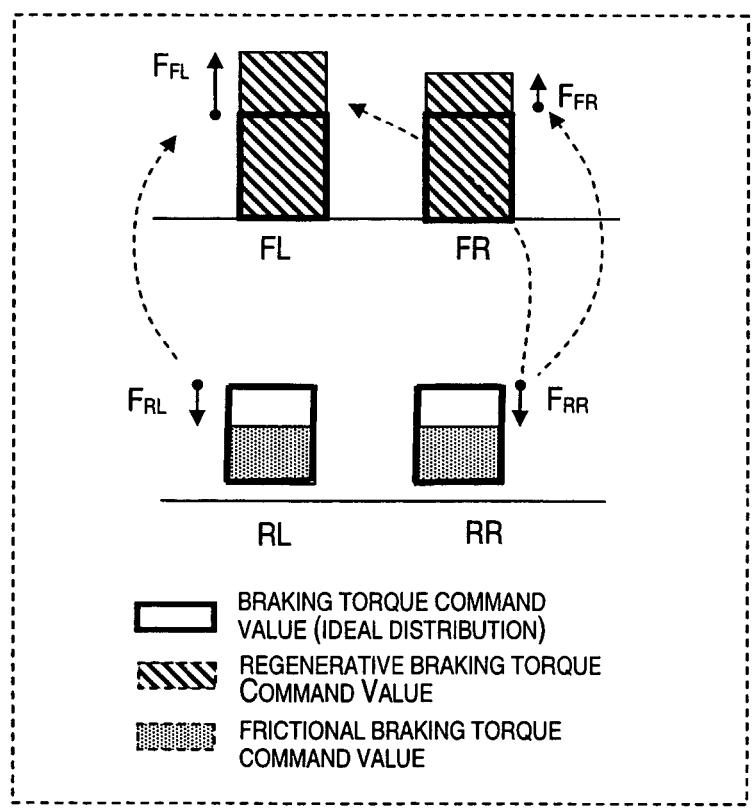
FIG. 22 is a diagram illustrating the reassignment of the braking torques among the four wheel of the vehicle illustrated in FIGS. 20 and 21 in accordance with the fifth case.

In the fifth case, as shown in FIGS. 20 to 22, a left and right braking torque distribution is assigned to the front wheels FL and FR to reduce partially or completely a new reassignment-induced yaw moment that is caused by the command values reassigning the front and rear braking torque distribution. In particular, the vehicle in this case is configured as a front wheel drive vehicle with each of the four wheels having independent frictional braking and the front wheels FL and FR also having left and right independent regenerative braking. FIG. 21 is a simplified schematic diagram of the vehicle of FIG. 20 turning to the left to show the changes in the moment arm lengths and the changes in reassignment of the braking torques in accordance with the fifth case, while FIG. 22 is a diagram illustrating the reassignment of the braking torques among the four wheel of the vehicle illustrated in FIGS. 20 and 21 in accordance with the fifth case.

In this fifth case, the front and rear braking torque distribution is varied to unequally increase the braking torques of the front wheels FL and FR and equally decrease the braking torques of the rear wheels RL and RR. Thus, in this fifth case, the left and right braking torque distribution of the front wheels FL and FR is varied in the front wheels FL and FR, while the left and right braking torque distribution of the frictional braking devices of the rear wheels RL and RR remain equal.

In this fifth case, variation of the assignment of a left and right braking torque difference in the front wheels FL and FR reduces understeer due to varying the front and rear braking torque distribution where the regenerative braking torques of the front wheels FL and FR is maximized. While each of the rear wheels RL and RR includes an independent frictional braking device, it will be apparent that in this case it is not necessary to have a vehicle configuration in which the left and right braking torque difference can be assigned the rear wheels RL and RR.

As seen in FIGS. 21 and 22, an example of reassigning braking torque between the front and rear wheels by the above-described control is illustrated in which a left and right braking torque difference is assigned to the front wheels FL and FR and the regenerative braking torques of the front wheels FL and FR is maximized. However, the left and right braking torque difference of the front wheels FL and FR can be produced by either solely using the front wheel frictional braking devices (case 5*a*), solely using the front wheel regenerative braking devices (case 5*b*) or a combination of both the front wheel frictional braking devices and the front wheel regenerative braking devices (case 5*c*).

In any case, when the vehicle is turning left, as shown in FIG. 21, the moment arm on the left front wheel side is made shorter and the moment arm on the right front wheel side is made longer. When command values are reassigned from the rear wheels RL and RR to the front wheels FL and FR in accordance with the arm length, the occurrence of the new reassignment-induced yaw moment is reduced partially or completely by adjusting the left and right braking torque distribution of the front wheels FL and FR so that the amount reassigned to the left front wheel side is greater than the amount reassigned to the right front wheel side, as shown in FIG. 22.

Basically, either the processing of FIGS. 3 and 6 or the processing of FIGS. 3 and 8 can be used to reassign braking torque between the front and rear wheels and a left and right braking torque difference in the front wheels FL and FR for the vehicle configuration of the fifth case as seen in FIG. 20. Thus, the specific processing for the reassignment of braking torques for the fifth case will not be further discussed herein.

Figure 23:
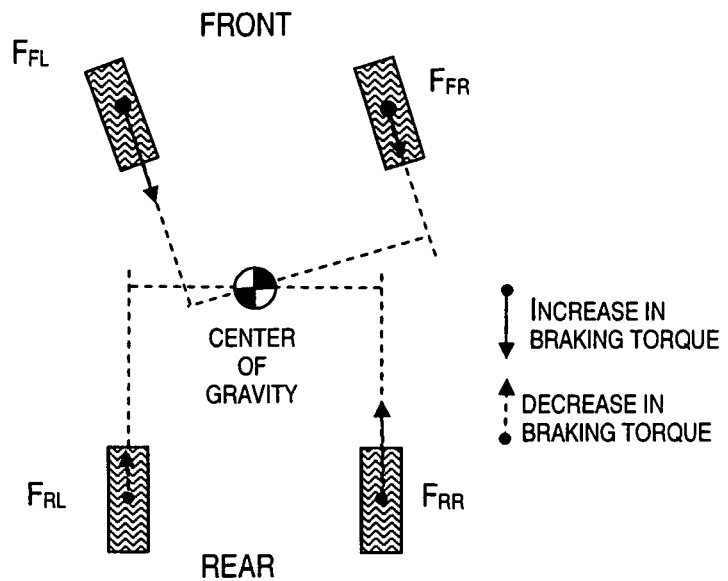
FIG. 23 is a simplified schematic diagram of the vehicle of FIG. 20 turning to the left to show the changes in the moment arm lengths and the changes in reassignment of the braking torques in accordance with the sixth case.
Figure 24:
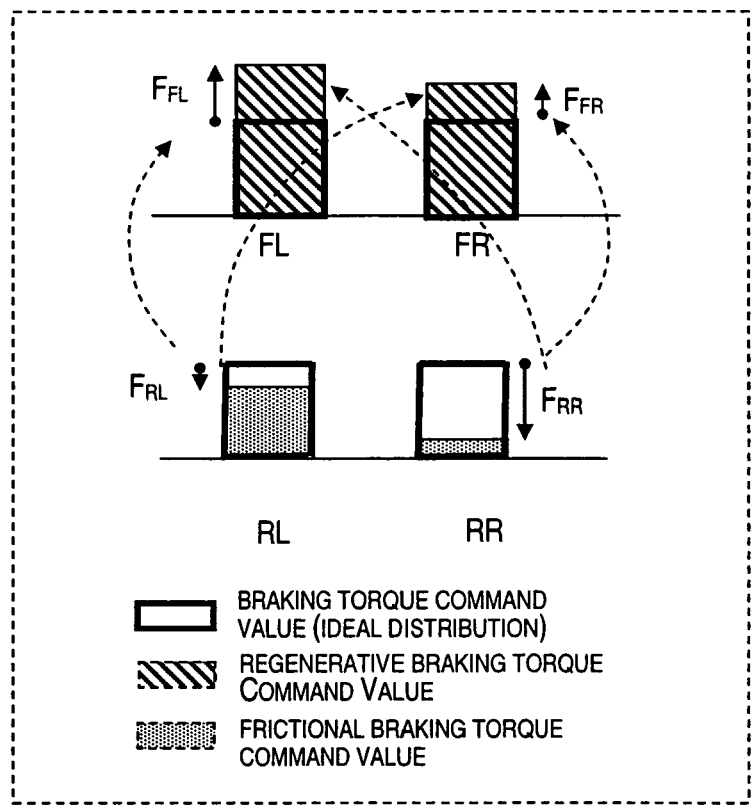
FIG. 24 is a diagram illustrating the reassignment of the braking torques among the four wheel of the vehicle illustrated in FIGS. 20 and 23 in accordance with the sixth case.

In sixth case, as shown in FIGS. 20, 23 and 24, a left and right braking torque distribution is assigned to both the front and rear wheels FL, FR, RL and RR to reduce partially or completely a new reassignment-induced yaw moment that is caused by the command values reassigning the front and rear braking torque distribution.

In particular, the vehicle in this case is configured as a front wheel drive vehicle with each of the four wheels having independent frictional braking and the front wheels FL and FR also having left and right independent regenerative braking as seen in FIG. 20. FIG. 23 is a simplified schematic diagram of the vehicle of FIG. 20 turning to the left to show the changes in the moment arm lengths and the changes in reassignment of the braking torques in accordance with the sixth case, while FIG. 24 is a diagram illustrating the reassignment of the braking torques among the four wheel of the vehicle illustrated in FIGS. 20 and 23 in accordance with the sixth case.

In the sixth case, the front and rear braking torque distribution is varied to unequally decrease the braking torques of the rear wheels RL and RR and unequally increase the braking torques of the front wheels FL and FR. Thus, in this sixth case, the left and right braking torque distributions of both the front and rear wheels FL, FR, RL and RR are varied in both the front and rear wheels FL, FR, RL and RR.

In sixth third case, variation of the assignment of the left and right braking torque difference in both the front and rear wheels FL, FR, RL and RR reduces understeer due to varying the front and rear braking torque distribution to greater extent than the fourth and fifth cases. Also the regenerative braking torques of the front wheels FL and FR is maximized.

As seen in FIGS. 23 and 24, an example of reassigning braking torque between the front and rear wheels by the above-described control is illustrated in which a left and right braking torque difference is assigned to both the front and rear wheels FL, FR, RL and RR and the regenerative braking torques of the front wheels FL and FR is maximized. However, the left and right braking torque difference of the front wheels FL and FR can be produced by either solely using the front wheel frictional braking devices (case 6*a*), solely using the front wheel regenerative braking devices (case 6*b*) or a combination of both the front wheel frictional braking devices and the front wheel regenerative braking devices (case 6*c*).

In any case, when the vehicle is turning left, as shown in FIG. 23, the moment arm on the left front wheel side is made shorter and the moment arm on the right front wheel side is made longer. When command values are reassigned from the rear wheels to the front wheels in accordance with the arm length, the occurrence of the new reassignment-induced yaw moment is reduced partially or completely by adjusting the left and right braking torque distributions of both the front and rear wheels FL, FR, RL and RR so that the amount reassigned to the left front wheel side is greater than the amount reassigned to the right front wheel side and the amount reassigned from the left rear wheel side is smaller than the amount reassigned from the right rear wheel side, as shown in FIG. 24.

Basically, either the processing of FIGS. 3 and 6 or the processing of FIGS. 3 and 8 can be used to reassign braking torque between the front and rear wheels and a left and right braking torque difference in the front and rear wheels FL, FR, RL and RR for the vehicle configuration of the sixth case as seen in FIG. 20. Thus, the specific processing for the reassignment of braking torques for the sixth case will not be further discussed herein.

In all of embodiments described above, the front wheels are exemplified as the steering wheels, but the rear wheels can be steering wheels as well. Also, the vehicle can be one in which regenerative braking is carried out on the steering wheel side. Furthermore, it will be apparent form this disclosure that each of the six cases, discussed above, can be applied to rear wheel drive vehicles in which the internal combustion engine drives the rear wheels.

The above embodiments were described with reference to a braking system in which two braking systems, namely, regenerative braking and frictional braking, are used as the braking devices, but the braking system can use only one of the braking devices. In short, the system can automatically vary, that is, reassign the distribution between the left and right steering wheels and the other wheels under certain conditions. It is also possible to use steering wheels that form a pair on the left and right of the other wheels. In this case, distribution between the left and right wheels can be adjusted based on the steering information.

Here, in all the embodiments, control is performed such that a difference is imparted to the distribution of braking torques to the left and right steering wheels by an amount that corresponds to the steering amount when braking torque is reassigned to the front and rear, but the present invention is not limited to this option alone. For example, when braking torques are reassigned to the front and rear, adjustment may be carried out so that a constant braking torque difference is imparted to the distributions in the left and right steering wheels. It is also possible to adopt an arrangement in which a determination is made as to which distribution to the steering wheel side should be made greater from among the left and right steering wheels in the steering direction, and the magnitude of the braking torque difference to be distributed to the left and right steering wheels is determined based on the lateral G-force or other information.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention. The term "detect" as used herein to describe an operation or function carried out by a component, a section, a device or the like includes a component, a section, a device or the like that does not require physical detection, but rather includes determining or computing or the like to carry out the operation or function. The term "configured" as used herein to describe a component, section or part of a device includes hardware and/or software that is constructed and/or programmed to carry out the desired function.

Moreover, terms that are expressed as "means-plus function" in the claims should include any structure that can be utilized to carry out the function of that part of the present invention. The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A vehicle braking control system comprising:
   a pair of laterally spaced first wheels configured and arranged to be steered;
   a pair of laterally spaced second wheels that are longitudinally separated from the first wheels in a front to aft vehicle direction;
   an independent braking component configured to independently control braking torques applied to the first and second wheels; and
   a steering detection component configured to detect a steering degree of the first wheels; and
   an excess distribution component configured to vary a front and rear braking torque distribution between the first and second wheels while keeping a total required braking torque imparted to all of the wheels substantially constant,
   the excess distribution component including a left and right wheel distribution adjusting component configured to adjust a left and right braking torque distribution of at least one of the pairs of the first and second wheels so that a left and right braking torque difference is applied to suppress a vehicle behavior that accompanies varying of the front and rear braking torque distribution between the first wheels and the second wheels based on the steering degree in the first wheels upon determining that steering in the first wheels is present.

2. The vehicle braking control system according to claim 1, wherein
the independent braking component includes a frictional braking system configured to apply a frictional braking torque to at least one of the pairs of the first and second wheels and a regenerative braking system configured to apply a regenerative braking torque to at least one of the pairs of the first and second wheels.

3. The vehicle braking control system according to claim 2, wherein
the left and right wheel distribution adjusting component of the excess distribution component is further configured to vary the left and right braking torque distribution of at least one of the pairs of the first and second wheels to increase the regenerative braking torque produced by regenerative braking with respect to an ideal distribution state of the braking torque.

4. The vehicle braking control system according to claim 2, wherein
the frictional braking system is configured to apply the frictional braking torque unequally between the first wheels in response to the braking torque distributions determined by the excess distribution component; and
the regenerative braking system is configured to apply the regenerative braking torque equally between the second wheels in response to the braking torque distributions determined by the excess distribution component.

5. The vehicle braking control system according to claim 2, wherein
the frictional braking system is configured to apply the frictional braking torque unequally between the second wheels in response to the braking torque distributions determined by the excess distribution component; and
the frictional braking system is configured to apply the frictional braking torque equally between the first wheels in response to the braking torque distributions determined by the excess distribution component.

6. The vehicle braking control system according to claim 2, wherein
the regenerative braking system is configured to apply the regenerative braking torque unequally between the second wheels in response to the braking torque distributions determined by the excess distribution component; and
the frictional braking system is configured to apply the frictional braking torque equally between the first wheels in response to the braking torque distributions determined by the excess distribution component.

7. The vehicle braking control system according to claim 2, wherein
the regenerative braking system and the frictional braking system are configured to apply both of the regenerative braking torque and the frictional braking torque unequally between the second wheels in response to the braking torque distributions determined by the excess distribution component; and
the frictional braking system is configured to apply the frictional braking torque equally between the first wheels in response to the braking torque distributions determined by the excess distribution component.

8. The vehicle braking control system according to claim 2, wherein
the frictional braking system are configured to apply the frictional braking torque unequally between the first wheels in response to the braking torque distributions determined by the excess distribution component; and
the regenerative braking system is further configured to apply the regenerative braking torque unequally between the second wheels in response to the braking torque distributions determined by the excess distribution component.

9. The vehicle braking control system according to claim 2, wherein
the frictional braking system is configured to apply the frictional braking torque unequally between the first wheels in response to the braking torque distributions determined by the excess distribution component; and
the regenerative braking system is configured to apply the regenerative braking torque unequally between the second wheels in response to the braking torque distributions determined by the excess distribution component.

10. The vehicle braking control system according to claim 2, wherein
the frictional braking system is configured to apply the frictional braking torque unequally between the first wheels in response to the braking torque distributions determined by the excess distribution component; and
the regenerative braking system and the frictional braking system are configured to apply both the frictional braking torque and the regenerative braking torque unequally between the second wheels in response to the braking torque distributions determined by the excess distribution component.

11. The vehicle braking control system according to claim 2, wherein
the frictional braking system is configured to apply the frictional braking torque unequally between the second wheels in response to the braking torque distributions determined by the excess distribution component; and
the regenerative braking system is configured to apply the regenerative braking torque equally between the first wheels in response to the braking torque distributions determined by the excess distribution component.

12. The vehicle braking control system according to claim 2, wherein
the frictional braking system is configured to apply the frictional braking torque unequally between the first wheels in response to the braking torque distributions determined by the excess distribution component; and
the frictional braking system is configured to apply the frictional braking torque equally between the second wheels in response to the braking torque distributions determined by the excess distribution component.

13. The vehicle braking control system according to claim 2, wherein
the regenerative braking system is configured to apply the regenerative braking torque unequally between the first wheels in response to the braking torque distributions determined by the excess distribution component; and
the frictional braking system is configured to apply the frictional braking torque equally between the second wheels in response to the braking torque distributions determined by the excess distribution component.

14. The vehicle braking control system according to claim 2, wherein
the regenerative braking system and the frictional braking system are configured to apply both of the regenerative braking torque and the frictional braking torque unequally between the first wheels in response to the braking torque distributions determined by the excess distribution component; and the frictional braking system is configured to apply the frictional braking torque equally between the second wheels in response to the braking torque distributions determined by the excess distribution component.

15. The vehicle braking control system according to claim 2, wherein
the frictional braking system is configured to apply the frictional braking torque unequally between the first wheels in response to the braking torque distributions determined by the excess distribution component; and
the frictional braking system is further configured to apply the frictional braking torque unequally between the second wheels in response to the braking torque distributions determined by the excess distribution component.

16. The vehicle braking control system according to claim 2, wherein
the frictional braking system is configured to apply the frictional braking torque unequally between the second wheels in response to the braking torque distributions determined by the excess distribution component; and
the regenerative braking system is configured to apply the regenerative braking torque unequally between the first wheels in response to the braking torque distributions determined by the excess distribution component.

17. The vehicle braking control system according to claim 2, wherein
the frictional braking system is configured to apply the frictional braking torque unequally between the second wheels in response to the braking torque distributions determined by the excess distribution component; and
the regenerative braking system and the frictional braking system are configured to apply both the frictional braking torque and the regenerative braking torque unequally between the first wheels in response to the braking torque distributions determined by the excess distribution component.

18. The vehicle braking control system according to claims 2, wherein
the excess distribution component is further configured to calculate reassigned braking torque amounts for the first and second wheels such that the front and rear braking torque distribution between the first and second wheels gives priority to maximizing regenerative braking.

19. The vehicle braking control system according to claims 2, wherein
the excess distribution component is further configured to calculate reassigned braking torque amounts for the first and second wheels such that the front and rear braking torque distribution between the first and second wheels gives priority to preventing a generation of a new yaw moment due to the varying of the front and rear braking torque distribution.

20. The vehicle braking control system according to claim 1, wherein
the second wheels are configured and arranged as non-steering wheels.

21. The vehicle braking control system according to claim 1, wherein
the left and right wheel distribution adjusting component is configured to adjust the left and right braking torque distribution to suppress a yaw moment from occurring due to varying of the front and rear distribution.

22. The vehicle braking control system according to claims 1, wherein
the left and right wheel distribution adjusting component is configured to adjust the left and right braking torque distribution such that as the steering amount increases the braking torque increases in a direction in which the vehicle behavior to be suppressed that accompanies the varying of the front and rear braking torque distribution.

23. The vehicle braking control system according to claim 1, wherein
the independent braking component includes a frictional braking system configured to independently apply a frictional braking torque to each of the first and second wheels and a regenerative braking system configured to independently apply a regenerative braking torque to at least one of the pairs of the first and second wheels.

24. A vehicle braking control system comprising:
means for detecting a steering degree of a pair of laterally spaced first wheels that are configured and arranged to be steered;
means for detecting a total braking command value to be applied to the first wheels and a pair of laterally spaced second wheels that are longitudinally separated from the first wheels in a front to aft vehicle direction;
means for varying a front and rear braking torque distribution between the first and second wheels while keeping a total required braking torque imparted to all of the wheels substantially constant; and
means for adjusting a left and right braking torque distribution of at least one of the pairs of the first and second wheels so that a left and right braking torque difference is applied to suppress a vehicle behavior that accompanies varying of the front and rear braking torque distribution based on the steering degree in the first wheels upon determining that steering in the first wheels is present.

25. A method of controlling a vehicle braking control system comprising:
detecting a steering degree of a pair of laterally spaced first wheels that are configured and arranged to be steered;
detecting a total braking command value to be applied to the first wheels and a pair of laterally spaced second wheels that are longitudinally separated from the first wheels in a front to aft vehicle direction;
varying a front and rear braking torque distribution between the first and second wheels while keeping a total required braking torque imparted to all of the wheels substantially constant; and
adjusting a left and right braking torque distribution of at least one of the pairs of the first and second wheels so that a left and right braking torque difference is applied to suppress a vehicle behavior that accompanies varying of the front and rear braking torque distribution based on the steering degree in the first wheels upon determining that steering in the first wheels is present.

* * * * *